(12) United States Patent
Harada et al.

(10) Patent No.: US 10,020,505 B2
(45) Date of Patent: Jul. 10, 2018

(54) ACTIVE MATERIAL, NONAQUEOUS ELECTROLYTE BATTERY, BATTERY PACK, AND VEHICLE

(71) Applicant: Kabushiki Kaisha Toshiba, Minato-ku (JP)

(72) Inventors: Yasuhiro Harada, Isehara (JP); Norio Takami, Yokohama (JP)

(73) Assignee: KABUSHIKI KAISHA TOSHIBA, Minato-ku (JP)

( * ) Notice: Subject to any disclaimer, the term of this patent is extended or adjusted under 35 U.S.C. 154(b) by 0 days.

(21) Appl. No.: 15/420,408

(22) Filed: Jan. 31, 2017

(65) Prior Publication Data

US 2017/0271662 A1  Sep. 21, 2017

(30) Foreign Application Priority Data

Mar. 15, 2016 (JP) ................... 2016-051365

(51) Int. Cl.
| | |
|---|---|
| *H01M 10/052* | (2010.01) |
| *H01M 4/485* | (2010.01) |
| *H01M 4/48* | (2010.01) |
| *C01G 23/00* | (2006.01) |
| *H01M 2/34* | (2006.01) |
| *H01M 10/0525* | (2010.01) |

(52) U.S. Cl.
CPC .......... *H01M 4/485* (2013.01); *C01G 23/003* (2013.01); *H01M 4/483* (2013.01); *H01M 10/052* (2013.01); *C01P 2002/72* (2013.01); *C01P 2002/74* (2013.01); *C01P 2002/76* (2013.01); *H01M 2/34* (2013.01); *H01M 10/0525* (2013.01); *H01M 2220/20* (2013.01); *H01M 2300/0017* (2013.01); *Y02E 60/122* (2013.01)

(58) Field of Classification Search
CPC ........................... H01M 4/485; H01M 10/052
See application file for complete search history.

(56) References Cited

U.S. PATENT DOCUMENTS

| | | | |
|---|---|---|---|
| 2012/0328930 A1 | 12/2012 | Inagaki et al. | |
| 2017/0062817 A1 | 3/2017 | Inagaki et al. | |

FOREIGN PATENT DOCUMENTS

| | | |
|---|---|---|
| CN | 103811738 A | 5/2014 |
| EP | 3 136 473 A1 | 3/2017 |
| JP | 2005-267940 | 9/2005 |
| JP | 2013-8493 | 1/2013 |
| JP | 2014-103032 | 6/2014 |
| JP | 2015-187936 | 10/2015 |

OTHER PUBLICATIONS

Lao et al. (Ceramics International, vol. 41, Issue 2, Part B, Mar. 2015, pp. 2900-2907).*

(Continued)

*Primary Examiner* — Olatunji Godo
(74) *Attorney, Agent, or Firm* — Oblon, McClelland, Maier & Neustadt, L.L.P.

(57) ABSTRACT

According to one embodiment, there is provided an active material that includes a composite oxide having a crystal structure belonging to a space group Fmmm. The composite oxide is represented by the formula: $Li_{2+x}Na_{2-y}M_zTi_6O_{14+\delta}$. Herein, M includes at least one of Mg, Ca, Sr, and Ba. x is within a range of $0 \leq x \leq 6$. y is within a range of $0 < y < 2$. z is within a range of $0 < z < 1$. $\delta$ is within a range of $-0.5 \leq \delta \leq 0.5$. Further, y is greater than z.

12 Claims, 8 Drawing Sheets

(56) References Cited

OTHER PUBLICATIONS

Yin et al. (Electrochemistry Communications, vol. 11, Issue 6, Jun. 2009, pp. 1251-1254).*

Izumi Nakai et al. "Funmatsu X sen Kaiseki no Jissai" Reality of Powder X-Ray Analysis, X-Ray Analysis Investigation Conversazione, The Japan Society for Analytical Chemistry, 7 pages ( with English Translation).

S.Y.Yin et al. "Reversible lithium storage in $Na_2Li_2Ti_6O_{14}$ as anode for lithium ion batteries", Electrochemistry Communications 11, 2009, 4 pages.

Pengfei Wang et al. "Enhanced lithium storage capability of sodium lithium titanate via lithium-site doping", Journal of Power Sources 297, 2015, 12 pages.

Extended European Search Report dated May 30, 2017 in European Patent Application No. 17150783.3.

Damien Dambournet, et al. $MLi_2Ti_6O_{14}$(M=Sr, Ba, 2Na) Lithium Insertion Titanate Materials: A Comparative Study, Inorganic Chemistry, XP055273926, vol. 49, No. 6, Mar. 15, 2010, pp. 2822-2826.

Mengmeng Lao, et al. "Preparation and Electrochemical Characterization of $Li_{2+x}Na_{2-x}Ti_6O_{14}$ (0≤x≤0.2) as Anode Materials for Lithium-Ion Batteries", Ceramics International, XP029106099, vol. 41, No. 2, 2015, pp. 2900-2907.

Seongjun Bae, et al., "Tunable lithium storage properties of metal lithium titanates by stoichiometric modulation", Electrochemistry Communications, vol. 64, 2016, pp. 26-29.

Mengmeng Lao, et al., "Enhanced electrochemical properties of $Mg^{2+}$ doped $Li_2Na_2Ti_6O_{14}$ anode material for lithium-ion batteries", Electrochimica Acta, vol. 196, 2016, pp. 642-652.

* cited by examiner

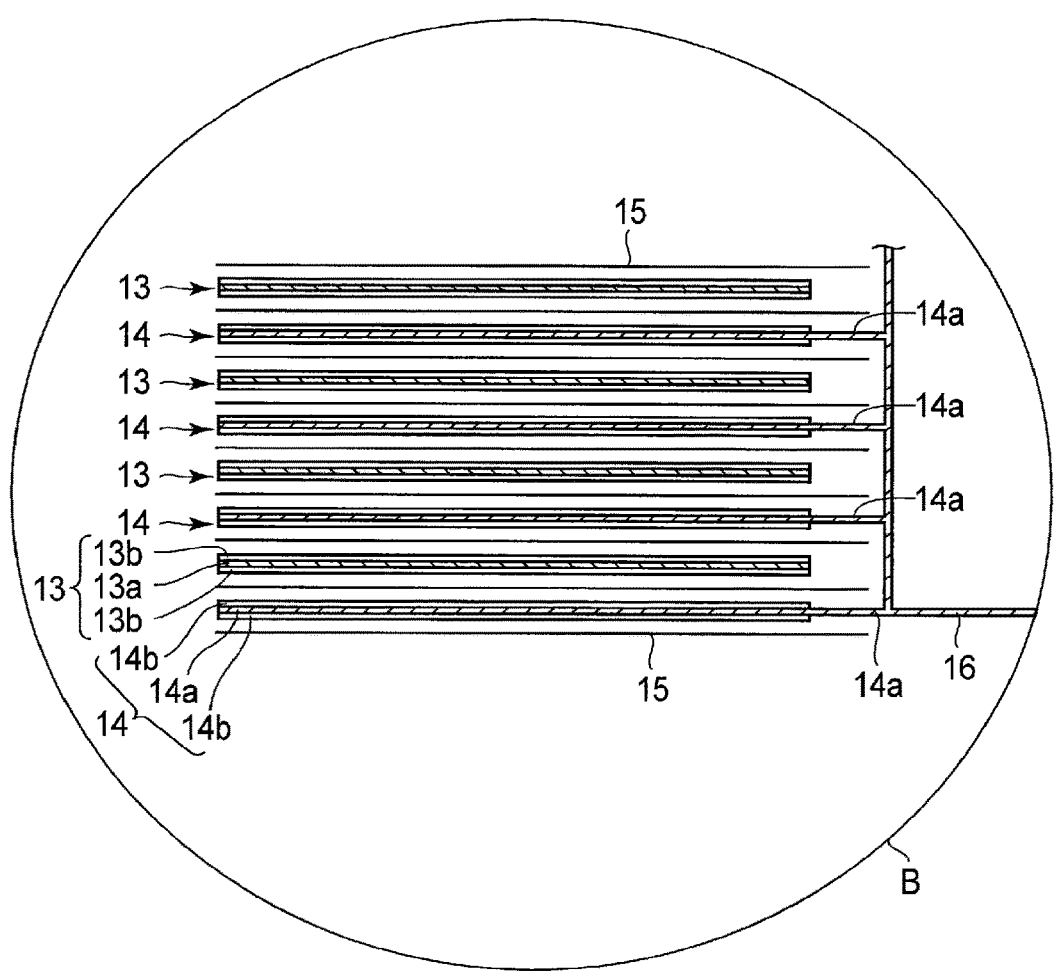
F I G. 5

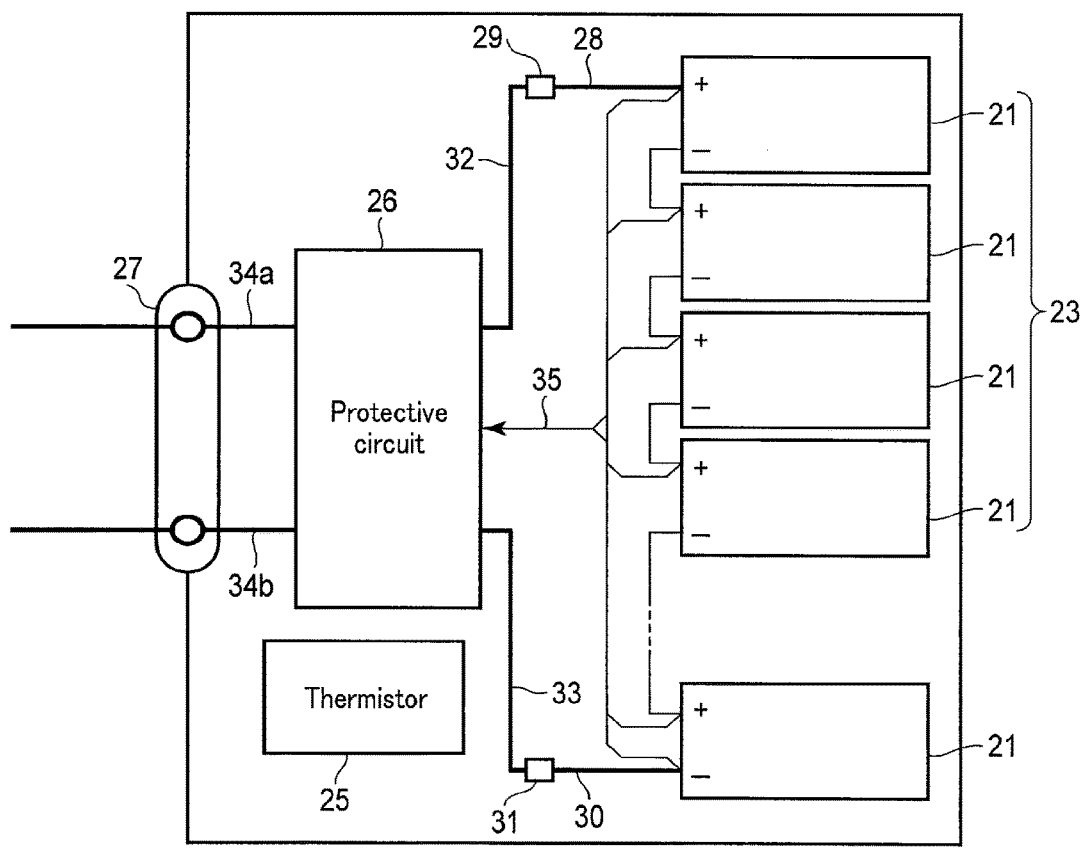
F I G. 7

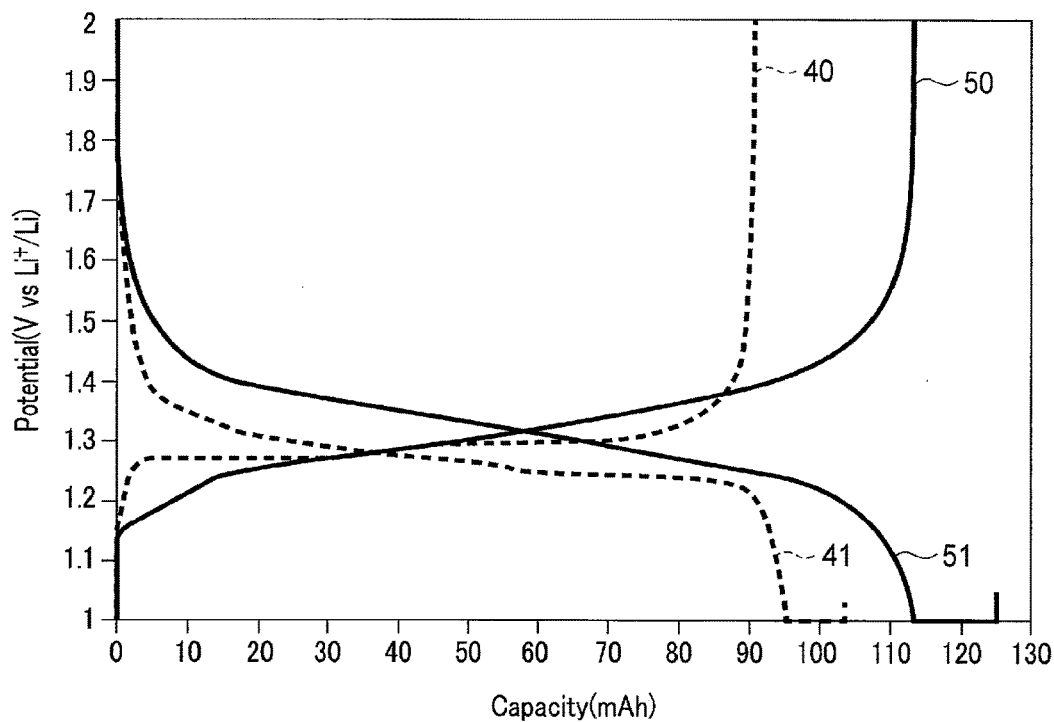
F I G. 10
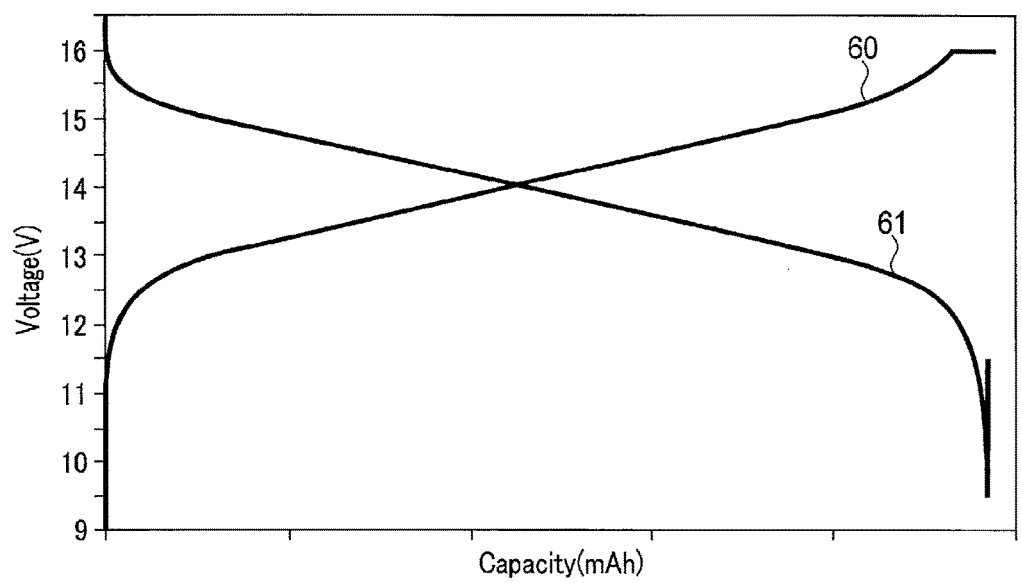
F I G. 11

ACTIVE MATERIAL, NONAQUEOUS ELECTROLYTE BATTERY, BATTERY PACK, AND VEHICLE

CROSS-REFERENCE TO RELATED APPLICATION

This application is based upon and claims the benefit of priority from Japanese Patent Application No. 2016-51365, filed Mar. 15, 2016; the entire contents of which is incorporated herein by reference.

FIELD

Embodiments relate to an active material, a nonaqueous electrolyte battery, a battery pack, and a vehicle.

BACKGROUND

Recently, a nonaqueous electrolyte battery such as a lithium ion secondary battery has been actively researched and developed as a high energy-density battery. The nonaqueous electrolyte battery is anticipated as a power source for vehicles such as hybrid automobiles, electric cars, an uninterruptible power supply for base stations for portable telephone, or the like. Therefore, the nonaqueous electrolyte battery is demanded to, in addition to having a high energy density, be excellent in other performances such as rapid charge-and-discharge performances and long-term reliability, as well. For example, not only is the charging time remarkably shortened in a nonaqueous electrolyte battery capable of rapid charge and discharge, but the battery is also capable of improving motive performances, such as in hybrid automobiles, and efficient recovery of regenerative energy of power.

In order to enable rapid charge-and-discharge, electrons and Li ions must be able to migrate rapidly between the positive electrode and the negative electrode. However, when a battery using a carbon-based negative electrode is repeatedly subjected to rapid charge-and-discharge, precipitation of dendrite of metallic lithium on the electrode may sometimes occur, raising concern of heat generation or fires due to internal short circuits.

In light of this, a battery using a metal composite oxide in a negative electrode in place of a carbonaceous material has been developed. In particular, in a battery using an oxide of titanium in the negative electrode, rapid charge-and-discharge can be stably performed. Such a battery also has a longer life than in the case of using a carbon-based negative electrode.

However, compared to carbonaceous materials, oxides of titanium have a higher potential relative to metallic lithium. That is, oxides of titanium are more noble. Furthermore, oxides of titanium have a lower capacity per weight. Therefore, a battery using an oxide of titanium as the negative electrode active material has a problem that the energy density is lower. In particular, when a material having a high potential relative to metallic lithium is used as a negative electrode material, the voltage becomes lower than that of a conventional battery using a carbonaceous material. Therefore, when such a material is used for systems requiring a high voltage such as an electric vehicle and a large-scale electric power storage system, there is a problem that the number of batteries connected in a series becomes large.

The potential of the electrode using an oxide of titanium is about 1.5 V (vs. Li/Li$^+$) relative to metallic lithium and is higher (more noble) than that of the negative electrode with carbonaceous material. The potential of an oxide of titanium arises from the redox reaction between Ti$^{3+}$ and Ti$^{4+}$ upon electrochemical insertion and extraction of Li, and is therefore electrochemically limited. It has therefore been conventionally difficult to drop the potential of the electrode in order to improve the energy density.

BRIEF DESCRIPTION OF THE DRAWINGS

FIG. 5 is an enlarged cross-sectional view showing a portion B in FIG. 4;

FIG. 7 is a block diagram showing an electric circuit of the battery pack of FIG. 6;

FIG. 10 shows initial charge-and-discharge curves of electrochemical cells obtained in Example 3 and Comparative Example 1;

FIG. 11 shows a charge-and-discharge curve of a battery module of nonaqueous electrolyte batteries obtained in Example 15.

DETAILED DESCRIPTION

Figure 1:
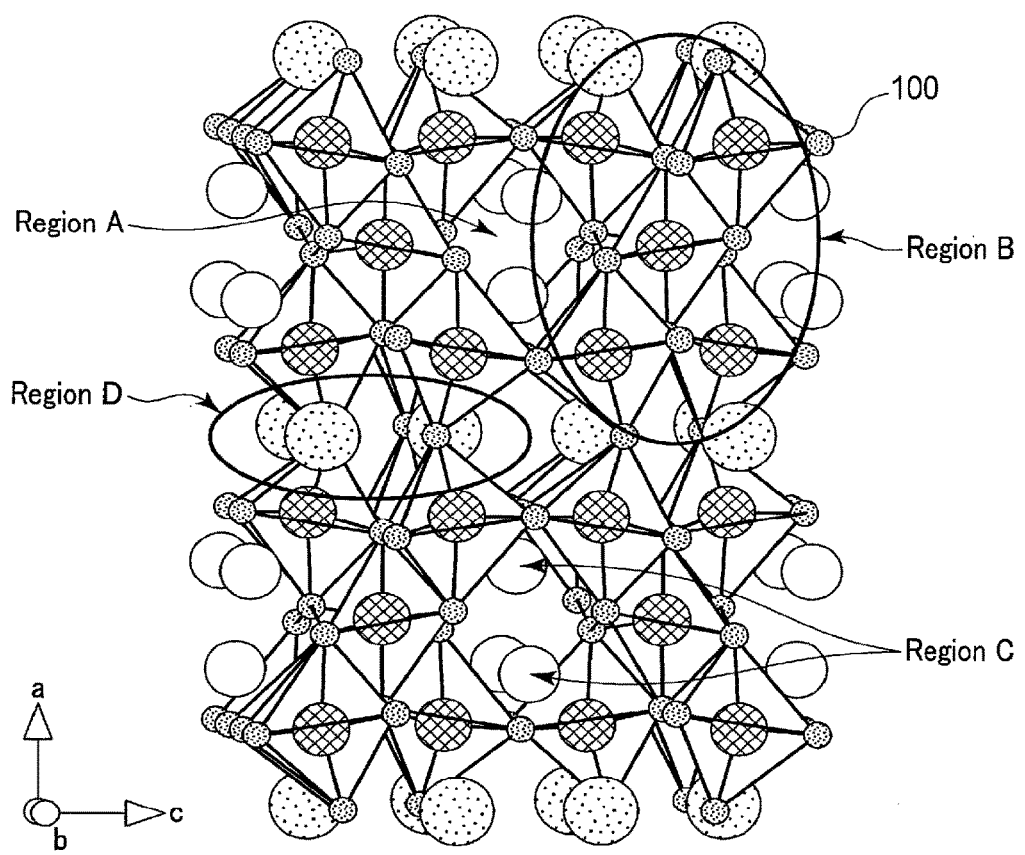
FIG. 1 is a schematic diagram showing a crystal structure Li$_2$Na$_{1.5}$Mg$_{0.25}$Ti$_6$O$_{14}$, which is an example of a composite oxide having symmetry of a space group Fmmm.

According to a first embodiment, there is provided an active material that includes a composite oxide having a crystal structure belonging to a space group Fmmm. The composite oxide is represented by the formula: Li$_{2+x}$Na$_{2-y}$M$_z$Ti$_6$O$_{14+\delta}$. Herein, M includes at least one of Mg, Ca, Sr, and Ba. x is within a range of 0≤x≤6. y is within a range of 0<y<2. z is within a range of 0<z<1. δ is within a range of −0.5≤δ≤0.5. Further, y is greater than z.

According to a second embodiment, a nonaqueous electrolyte battery is provided. The nonaqueous electrolyte battery includes a negative electrode, a positive electrode, and a nonaqueous electrolyte. The negative electrode includes the active material according to the first embodiment.

According to a third embodiment, a battery pack is provided. The battery pack includes the nonaqueous electrolyte battery according to the second embodiment.

According to a fourth embodiment, a vehicle is provided. The vehicle includes the battery pack according to the third embodiment.

Embodiments will be explained below with reference to the drawings. Structures common among the embodiments are represented by the same symbols and over-lapping explanations are omitted. Also, each drawing is a typical view for explaining the embodiments and for promoting an understanding of the embodiments. Though there are parts different from an actual device in shape, dimension and ratio, these structural designs may be properly changed taking the following explanations and known technologies into consideration.

(First Embodiment)

According to a first embodiment, there is provided an active material including a composite oxide having an orthorhombic crystal structure belonging to a space group Fmmm. This composite oxide is an active material represented by the formula: $Li_{2+x}Na_{2-y}M_zTi_6O_{14+\delta}$, wherein M includes at least one of Mg, Ca, Sr, and Ba, x is within a range of $0 \leq x \leq 6$, y is within a range of $0 < y < 2$, z is within a range of $0 < z < 1$, and $\delta$ is within a range of $-0.5 \leq \delta \leq 0.5$. In the formula, y is greater than z.

In a preferable aspect, the composite oxide included in the active material according to the first embodiment may correspond to a substituted composite oxide in which, in a crystal structure of a composite oxide represented by the formula: $Li_{2+x}Na_2Ti_6O_{14}$, where the crystal structure belongs to a space group Fmmm, a part of Na sites is substituted by a cation M and/or Na is removed from a part of the Na sites to form vacancies (vacancy sites).

When the Na amount in the crystal structure of the composite oxide is changed, a behavior of electric potential of the composite oxide based on the oxidation-reduction potential of metallic lithium is changed. The active material according to the first embodiment, which includes a composite oxide represented by the formula: $Li_{2x}Na_{2-y}M_zTi_6O_{14\delta}$ wherein y is within a range of $0 < y < 2$, can have an average potential of lithium insertion within a range of 1.0 V (vs. Li/Li$^+$) to 1.45 V (vs. Li/Li$^+$) relative to the oxidation-reduction potential of metallic lithium. Thus, a nonaqueous electrolyte battery using the active material according to the first embodiment as a negative electrode can exhibit a battery voltage higher than that of, for example, a nonaqueous electrolyte battery using a titanium composite oxide having an average potential of lithium insertion of 1.55 V (vs. Li/Li$^+$), as the negative electrode.

Further, since the composite oxide represented by the formula: $Li_{2+x}Na_{2-y}M_zTi_6O_{14+\delta}$ satisfies the condition of y>z, portions corresponding to a part of the Na sites are vacant. The vacancy can serve as a site for insertion and extraction of lithium ions. For this reason, in the composite oxide including such vacancies, Li ions can be more easily inserted and extracted than in the composite oxide represented by the formula: $Li_2Na_2Ti_6O_{14}$; as a result, a higher charge-and-discharge capacity can be realized.

In the composite oxide, the total valence of the cations coincides with the total valence of oxide ions which are anions, and thus the charge neutrality is maintained. Specifically, in the composite oxide, the total valence of the lithium ions is 2+x. The total valence of the sodium ions is 2−y. The total valence of M is 2×z. The total valence of Ti is 4×6=24. The total valence of these cations coincides with the total valence of oxide ions which are anions: $(-2)\times(14+\delta)$. Here, the subscript $\delta$ of the oxide ion can have a value within a range of −0.5 to 0.5, and thus the same effects can be obtained even if the total valence of the cations described above varies within a range of ±1 relative to a valence of −28, which is the total valence of the oxide ions. In the case where $\delta$ is beyond the range of $-0.5 \leq \delta \leq 0.5$, there is a possibility that the oxidation-reduction state of the cations is deviated from a stable state, or a lattice defect such as an oxygen deficiency has occurred. In this case, the battery performance is reduced, and therefore not preferable.

Here, under the assumption that the cations that compose the composite oxide are in a stable oxidation state, and oxide ions exist in a proper quantity, then $\delta=0$. Thus in such a case, the total valence of the oxide ions is $-2 \times 14 = -28$. In this case, the state in which the total valence of the cations coincides with the total valence of the anions is represented by the following formula (1):

$$(2+x)+(2-y)+2\times z+(4\times 6)-28=0 \quad (1)$$

The formula (1) can be organized into the following formula (2):

$$x-y+2z=0 \quad (2)$$

The charge neutrality in the crystal structure of the composite oxide can be maintained by satisfying the conditions of the formula (2). The composite oxide $Li_{2+x}Na_{2-y}M_zTi_6O_{14+\delta}$ whose charge neutrality is maintained is a substituted oxide in which a part of the Na sites is properly substituted by the cation M in the crystal structure of the composite oxide represented by the formula: $Li_2Na_2Ti_6O_{14+\delta}$. Further, in the composite oxide $Li_{2+x}Na_{2-y}M_zTi_6O_{14+\delta}$ whose charge neutrality is maintained, portions corresponding to a part of the Na sites in the crystal structure of the composite oxide represented by the formula: $Li_2Na_2Ti_6O_{14}$ can stably exist as vacancies in the crystal structure. By including such a substituted oxide, in which the cation M is properly substituted in the crystal structure of the composite oxide represented by the formula: $Li_2Na_2Ti_6O_{14}$, and which includes the vacancies that can stably exist in the crystal structure, in the active material according to the first embodiment, a coordination environment of the oxide ions relative to vacancy sites, into which lithium ions are inserted, can be made uniform. Accordingly, by using the active material according to the first embodiment as an active material for a battery, there can be provided a nonaqueous electrolyte battery capable of exhibiting high reversible capacity in the charge and discharge, and excellent life performance. In particular, an even higher reversible capacity can be realized by the substituted oxide in which a part of the Na sites in the composite oxide $Li_2Na_2Ti_6O_{14}$ are substituted by stably existing vacancies, because electrical charge repulsion is reduced at sites that can serve as hosts for Li ions.

For such reasons, when the active material according to the first embodiment is used as a battery active material, it is possible to realize a nonaqueous electrolyte battery which can exhibit high energy density and high battery voltage, and can also exhibit an excellent life performance.

The subscript x in the formula: $Li_{2+x}Na_{2-y}M_zTi_6O_{14+\delta}$ for the composite oxide indicates an amount of lithium in the crystal structure of the composite oxide and is within a range of $0 \leq x \leq 6$. The total amount of lithium in the composite oxide, which includes lithium within the crystal structure and lithium inserted into vacant sites, can vary depending on the state-of-charge of the composite oxide. For example, according to a production method described later, a composite oxide in which the subscript x is 0 in the formula described above can be produced. When the composite oxide in which the subscript x is 0 is incorporated in a nonaqueous electrolyte battery as the negative electrode active material, and the resulting nonaqueous electrolyte battery is charged, the total amount of lithium is elevated to a value within a range of from more than 2 to 8. At this time, when one Li ion is inserted into the crystal structure, a Ti ion is reduced from a tetravalent state to a trivalent state, in order for the charge neutrality in the crystal structure to be maintained. Since six Ti ions are included in the formula of the composite oxide, a maximum of six Li ions can be inserted.

The subscript 2−y in the formula: $Li_{2+x}Na_{2-y}M_zTi_6O_{14+\delta}$ for the composite oxide indicates a Na amount in the crystal structure of this composite oxide. In the active material according to the first embodiment, an average operating potential of an electrode including the active material can be adjusted within a range of 1.0 V (vs. Li/Li$^+$) to 1.45 V (vs. Li/Li$^+$) relative to the oxidation-reduction potential of metallic lithium by changing the Na amount in the crystal structure, i.e., the value of the subscript y. Accordingly, the design setting of the operating potential of the battery becomes easy. From a different perspective, the subscript y is an index showing a proportion of portions in the substituted composite oxide that are sites substituted by the cation M or the vacancies, among the sites corresponding to the Na sites in the composite oxide $Li_2Na_2Ti_6O_{14}$. The subscript y is within a range of 0<y<2, preferably within a range of 0.1≤y≤0.9, and more preferably within a range of 0.25≤y≤0.5.

The subscript z in the formula: $Li_{2+x}Na_{2-y}M_zTi_6O_{14+\delta}$ indicates an amount of cation M included in the crystal structure of the composite oxide represented by this formula. Further, the cation M is one with which a part of the Na sites in the composite oxide $Li_2Na_2Ti_6O_{14}$ is substituted. Accordingly, the combination of the subscript y and the subscript z is an index showing a proportion of portions in the substituted composite oxide that are sites substituted by the cation M, among the sites corresponding to the Na sites in the composite oxide $Li_2Na_2Ti_6O_{14}$. The Na ion is monovalent, whereas the cation M is divalent. Thus, in the composite oxide whose charge neutrality is maintained, the value of the subscript z is smaller than the value of the subscript y. The subscript z is within a range of 0<z<1. Therefore, the composite oxide represented by the formula: $Li_{2+x}Na_{2-y}M_zTi_6O_{14+\delta}$, includes the cation M. In this composite oxide, portions corresponding to a part of the Na sites in the composite oxide $Li_2Na_2Ti_6O_{14}$, i.e., portions represented by the subscript y-z, are vacant.

When Na ions are removed from a part of the Na sites in the composite oxide $Li_2Na_2Ti_6O_{14}$ to form a vacancy, the total valence of the cations in the composite oxide is reduced. Specifically, when n moles of Na ions are removed from 1 mole of the composite oxide $Li_2Na_2Ti_6O_{14}$ to form n moles of vacancies, the total valence of the cations in this composite oxide is reduced by n. In such a case, the charge neutrality can be maintained, for example, by substituting a part of Na sites in the composite oxide $Li_2Na_2Ti_6O_{14}$ by Li or a divalent cation as the cation M, so as to compensate for the reduced valences n. Such a substitution can reduce Na ions, which impedes lithium ion conduction, and vacancies serving as host sites of Li ions can be increased, while the crystal structure of the composite oxide $Li_2Na_2Ti_6O_{14}$ is maintained. Thus, the substituted composite oxide capable of realizing an improved charge-and-discharge capacity can be obtained.

The subscript δ in the formula: $Li_{2+x}Na_{2-y}M_zTi_6O_{14+\delta}$ for the composite oxide may vary within a range of −0.5≤δ≤0.5 depending on the oxygen deficiency of the composite oxide represented by this formula or the amount of oxygen inevitably incorporated during the production process of the active material.

Although each of the subscripts x, y, z, and δ can be of any value within the specific ranges, as described above, in the composite oxide represented by the formula of $Li_{2+x}Na_{2-y}M_zTi_6O_{14+\delta}$, the total valence of the cations is equal to the total valence of the anions.

In an X-ray diffraction diagram for the composite oxide represented by the formula: $Li_{2+x}Na_{2-y}M_zTi_6O_{14+\delta}$ obtained by a powder X-ray diffraction using Cu-Kα rays, it is preferable that an intensity ratio $I_H/I_L$ is within a range of $0<I_H/I_L<2.35$, wherein $I_L$ is an intensity of a strongest diffraction peak appearing in a range of 27.0°≤2θ≤31.0°, and $I_H$ is an intensity of a strongest diffraction peak appearing in a range of 44.0°≤2θ≤46.0°. A composite oxide according to a preferable aspect, in which the intensity ratio $I_H/I_L$ is within a range of $0≤I_H/I_L≤2.35$ in an X-ray diffraction pattern of the composite oxide obtained according to a powder X-ray diffraction method, is a composite oxide having an orthorhombic crystal structure belonging to a space group Fmmm. In such a composite oxide, in the X-ray diffraction pattern for the composite oxide obtained by the powder X-ray diffraction using Cu-Kα rays, an intensity ratio is within a range of $0<I_{H1}/I_{L1}<2.35$, wherein $I_{L1}$ is an intensity of a diffraction peak corresponding to a (113) plane, and $I_{H1}$ is an intensity of a diffraction peak corresponding to a (024) plane.

FIG. 1 is a schematic diagram showing a crystal structure of $Li_2Na_{1.5}M_{0.25}Ti_6O_{14}$, which is an example of a composite oxide having symmetry belonging to a space group Fmmm.

In the crystal structure shown in FIG. 1, the smallest spheres 100 indicate positions of oxide ions.

In the crystal structure shown in FIG. 1, a region A indicates a vacancy site having a channel in which the lithium ion can three-dimensionally move within the crystal structure, and lithium ions can be inserted and extracted in the region A. A region B has a polyhedral structure of oxide centered about Ti, serving as the framework of the crystal structure. On the other hand, a region C is a site where lithium ions, which can be inserted and extracted, exist. A region D is a site where Mg, Na, and Li, which function as framework for stabilizing the crystal structure, exist. In the X-ray diffraction pattern of the composite oxide of this example measured according to the powder X-ray diffraction using Cu-Kα rays, an intensity ratio is within a range of $0<I_{H1}/I_{L1}<2.35$. Here, $I_{L1}$ is an intensity of a diffraction peak corresponding to a (113) plane, and $I_{H1}$ is an intensity of a diffraction peak corresponding to a (024) plane.

In such a composite oxide, crystallites have grown in a direction preferable for inserting and extracting lithium ions. In addition, lithium ions can be inserted into vacancy sites. Accordingly, the active material including the composite oxide of this example is preferable as the active material for a battery, because the effective capacity can be increased, and the life performance of the nonaqueous electrolyte battery can be improved.

Even if the active material according to the first embodiment includes in a proportion of less than 50%, a composite oxide having a crystal structure in which a crystal phase belonging to a symmetry other than the Fmmm symmetry is mixed, or a composite oxide having a crystal structure similar to the Fmmm symmetry, the same effects as those obtained in the active material including 100% of the composite oxide having the symmetry of the space group Fmmm can be obtained. Specific examples of the symmetry similar to the Fmmm symmetry may include Cmca, F222, Pmcm, Pmma, and Cmma. In the composite oxide having the crystal structure belonging to such symmetries as described above, regardless of the crystal plane indices, an intensity ratio $I_H/I_L$ is preferably within a range of $0<I_H/I_L<2.35$, wherein $I_L$ is an intensity of a strongest diffraction peak appearing in a range of 27.0°≤2θ≤31.0°, and $I_H$ is an intensity of a strongest diffraction peak appearing in a range of 44.0°≤2θ≤46.0°. In this case, the reversibility of lithium ion during charge-and-discharge is improved, whereby the effective capacity is increased, and the life performance of the nonaqueous electrolyte battery can be improved.

The active material according to the first embodiment includes a composite oxide that has an orthorhombic crystal structure belonging to a space group Fmmm and is represented by the formula: $Li_{2+x}Na_{2-y}M_zTi_6O_{14+\delta}$, wherein M is at least one selected from the group consisting of Mg, Ca, Sr, or Ba; x is within a range of $0 \le x \le 6$; y is within a range of $0 < y < 2$; z is within a range of $0 < z < 1$; δ is within a range of $-0.5 \le \delta \le 0.5$; and y is greater than z.

This composite oxide corresponds to a substituted composite oxide in which a part of Na in the Na sites is reduced to thereby form vacant sites serving as hosts for the Li ions in the crystal structure belonging to a space group Fmmm of the composite oxide represented by the formula: $Li_2Na_2Ti_6O_{14}$. Thus, the energy density per unit weight or unit volume can be increased while a lattice volume capable of easily inserting and extracting the lithium ions is maintained. In addition, by changing the Na amount, the average operating potential of the electrode can be changed. Accordingly, it is easy to design the potential setting of the battery.

The composite oxide included in the active material according to the first embodiment may be in a particulate form, for example. The average particle size of the composite oxide included in the active material of the first embodiment is not particularly limited, and can be changed according to desired battery performance.

The active material according to the first embodiment preferably includes the above composite oxide particles and a conductive substance such as carbon coating at least a part of the surface thereof. The active material of such a preferable aspect can exhibit improved rapid charge-and-discharge performance. Since the insertion and extraction of Li occur through a homogeneous solid-state reaction in the composite oxide, the composite oxide has a property where electrical conductivity increases in accordance with increasing amount of Li inserted. In such a composite oxide, electrical conductivity becomes relatively low in a region with a low amount of inserted Li. Therefore, by coating the surface of composite oxide particles in advance with a conductive substance such as carbon, a high rapid charge-and-discharge performance can be obtained, regardless of the inserted amount of Li.

Alternatively, by coating at least a part of the surface of the composite oxide particles with lithium titanate, which exhibit electrical conductivity in accordance with insertion of Li, in place of the conductive substance such as carbon, the same effect can be obtained.

In addition, lithium is extracted from lithium titanate coating at least a part of the surface of the composite oxide particles, when the battery is internally short-circuited, and the lithium titanate becomes insulating. Therefore, excellent safety can be achieved.

<BET Specific Surface Area>

The BET specific surface area of the composite oxide included in the active material according to the first embodiment is not particularly limited, and is preferably 3 $m^2/g$ or more and less than 200 $m^2/g$. The BET specific surface area is more preferably 5 $m^2/g$ to 30 $m^2/g$.

When the BET specific surface area is 3 $m^2/g$ or more, the contact area with the electrolyte solution can be secured. Thus, good discharge rate performances can be easily obtained and also, a charge time can be shortened.

On the other hand, when the BET specific surface area is less than 200 m/g, reactivity with the electrolyte solution can be prevented from being too high and therefore, the life performance can be improved. When the BET specific surface area is 30 $m^2/g$ or less, side reactions with the electrolyte solution can be suppressed, and thereby longer life can be further expected. Furthermore, in this case, a coatability of a slurry including the active material used in the production of an electrode, which will be described later, can be improved.

Here, as the measurement of the specific surface area, a method is used where molecules, in which an occupied area in adsorption is known, are adsorbed onto the surface of powder particles at the temperature of liquid nitrogen, and the specific surface area of the sample is determined from the amount of adsorbed molecules. The most frequently used method is a BET method based on the low temperature/low humidity physical adsorption of an inert gas. This is a method based on the BET theory, which is the most well-known theory of the method of calculating the specific surface area in which the Langmuir theory, which is a monolayer adsorption theory, is extended to multilayer adsorption. The specific surface area determined by the above method is referred to as "BET specific surface area".

<Production Method>

The composite oxide including the active material according to the first embodiment can be synthesized, for example, by a solid phase reaction as described below.

First, raw materials, such as an oxide, a compound, and a salt, are mixed in an appropriate stoichiometric ratio to obtain a mixture. The above salt is preferably a salt such as a carbonate or nitrate, which decomposes at a relatively low temperature to form an oxide. Next, the obtained mixture is ground and mixed as uniformly as possible. When the raw materials are wet-mixed by adding a solvent, the raw materials are uniformly mixed. Thus, a target single phase of a crystal phase can be obtained, which is preferred. Subsequently, the resulting mixture is pre-calcined. The pre-calcination is performed at a temperature range of 600° C. to 850° C. in air for a total of 1 to 6 hours. Then, the calcination temperature is increased and main-calcination is performed at 900° C. to 1500° C. in air. It is preferable that the pre-calcined mixture is re-mixed before the main-calcination. The pre-calcination is performed as above to decompose the carbonates or the like in the raw materials in advance, and then, the materials are mixed again, whereby the raw material particles can adhere to each other in the main calcination. As a result, uniform particles having high crystallinity can be obtained. Further, the main-calcination may be carried out by performing the calcination in a plural number of times during which, the mixture is re-mixed upon each calcination. When the main-calcination is performed in this manner, the mixture is re-mixed at regular intervals. Thus, the obtained product can be made more uniform.

Lithium, which is a light element, may be vaporized due to calcining at 800° C. or higher, although this may depend on the furnace size. In such a case, a vaporized amount of lithium in the calcination conditions is investigated, and the vaporized amount that has been found is compensated for by providing a raw material including lithium in an excess amount to obtain a sample having a proper composition. For example, in a preliminary experiment, the vaporized amount of the lithium when calcining was performed at a calcination temperature of about 800° C. has been analyzed. As a result, a vaporized amount of lithium carbonate corresponding to 3% has been observed. In this case, the amount of lithium carbonate is provided in a higher amount than that of the target composition by 3%. Thus, in order to eliminate small variations in the composition or impurities which are undetectable by the powder X-ray diffraction described later to thereby properly obtain a target crystal phase, it is preferable to adjust the amount of lithium in the raw material to be a little in excess.

Further, it is more preferable to prevent a lattice defect due to oxygen deficiency or the like. For example, the raw material powder may be press-molded into pellets or rods before the main-calcination to decrease an area brought into contact with the air and to increase the contact surface between particles before calcination, whereby the generation of the lattice defect can be suppressed. In a case of industrial mass production, it is preferable that when the raw material powder is calcined, the calcination is performed under a high oxygen partial pressure such as under an oxygen atmosphere, or a heat treatment (annealing) is performed at a temperature range of 400° C. to 1000° C. to restore the oxygen deficiency after a standard calcination in air. When the generation of the lattice defect is not suppressed by such methods, the crystallinity may possibly be reduced.

A composite oxide obtained by the synthesis above has symmetry according to the space group Fmmm, and in the X-ray diffraction pattern obtained according to the powder X-ray diffraction using Cu-Kα rays for the composite oxide, the intensity ratio $I_{H1}/I_{L1}$ is within a range of $0<I_{H1}/I_{L1}<2.35$. Here, the intensity $I_{L1}$ is an intensity of a diffraction peak corresponding to a (113) plane, and the intensity $I_{H1}$ is an intensity of a diffraction peak corresponding to a (024) plane.

When the synthesis is performed as described above, for example, the composite oxide represented by the above formula wherein the subscript x is 0 can be produced, as explained above. The composite oxide in a state in which the value of x+2 is within a range of more than 2 and 8 or less can be obtained by synthesizing the composite oxide wherein the subscript x is 0, and then immersing the composite oxide into an aqueous lithium hydroxide solution so as to allow the Li ions to be chemically inserted.

Next, a method for obtaining the X-ray diffraction pattern of the composite oxide according to the powder X-ray diffraction, as well as a method for examining the composition of the composite oxide and the oxidation-reduction state of each element will be described.

When a target active material to be measured is included in an electrode material of a nonaqueous electrolyte battery, a pre-treatment is performed as described below.

First, a state close to the state in which lithium ions are completely extracted from a crystal of the active material is achieved. When the target active material to be measured is included in a negative electrode, the battery is brought into a completely discharged state. The state in which the battery is completely discharged indicates a state in which an electrode including the active material is held for 10 hours or more at a potential of +3.0 V (vs. Li/Li$^+$) with respect to a metallic lithium potential to extract mobile lithium ions within the active material. In the composite oxide according to the first embodiment, Ti ions included in the crystal structure becomes tetravalent in a completely discharged state.

Specifically, in order to achieve the state in which the battery is completely discharged, after the above battery is disassembled under a dry argon gas atmosphere, an electrode including the active material is taken out. Using this electrode, a three-pole half cell with lithium metal as counter electrode and reference electrode is constructed. In this case, the electrode operates as a positive electrode with respect to a lithium metal negative electrode. A current, which is 1/20 or less of an electrode capacity (mAh), i.e., equivalent to 0.05 C, is flown in a charging direction (a direction where lithium is extracted from the electrode) by using a charging/discharging device until the cell potential in the half cell reaches 3.0 V. Once the cell potential has reached 3.0 V, by maintaining the potential at this value further for 10 hours or more to perform extraction of Li ions from the electrode including the active material, the completely discharged state can be achieved. Although a slight amount of remnant Li ions may exist even in the discharged state, this does not significantly affect results of powder X-ray diffraction measurement described below.

Next, the battery (half cell) is disassembled in a glove box filled with argon, and the electrode is taken out. The taken-out electrode is washed with an appropriate solvent and dried under a reduced pressure. As the solvent, for example, ethyl methyl carbonate may be used. After washing and drying, whether or not there are white precipitates such as a lithium salt on the surface is examined.

When subjecting to the powder X-ray diffraction measurement, as described later, the washed electrode is cut into a size having the same area as that of a holder of the powder X-ray diffraction apparatus, and used as a measurement sample.

When subjecting to a composition analysis, the active material is taken out from the washed electrode, and the taken out active material is analyzed, as described later.

As described later, the oxidation-reduction state is examined by analyzing via X-ray Photoelectron Spectroscopy (XPS). In the case of subjecting to XPS, as described later, the washed electrode is cut into a size that fits within the holder of the XPS apparatus, and used as a measurement sample.

<Method for Obtaining X-Ray Diffraction Pattern of Composite Oxide according to Powder X-Ray Diffraction>

The powder X-ray diffraction measurement of the active material is performed as follows: First, the target sample is ground until an average particle size becomes about 5 μm. Even if the original average particle size is less than 5 μm, it is preferable that the sample is subjected to a grinding treatment with a mortar in order to grind apart aggregates. The average particle size can be obtained by laser diffraction. The ground sample is filled in a holder part having a depth of 0.5 mm, formed on a glass sample plate. A glass sample plate manufactured by Rigaku Corporation is used as the glass sample plate, for example. At this time, care should be taken to fill the holder part sufficiently with the sample. Precaution should be taken to avoid cracking and formation of voids caused by insufficient filling of the sample. Then, another glass plate is used to smoothen the surface of the sample by sufficiently pressing the glass plate against the sample. In this case, precaution should be taken to avoid too much or too little a filling amount, so as to prevent any rises and dents in the basic plane of the glass holder. Next, the glass plate filled with the sample is set in a powder X-ray diffractometer. And then, a diffraction pattern [XRD (X-ray diffraction) pattern] is obtained using Cu-Kα rays.

In some cases, an orientation in which crystal planes are arranged in a specific direction may be observed from the results of the Rietveld analysis, depending on the shapes of particles. In such a case, there is the possibility of deviation of peak position and variation in an intensity ratio, depending on how the sample is filled. Such a sample having high orientation is desirably measured using a capillary (cylindrical glass narrow tube). Specifically, the sample is inserted into the capillary, which is then mounted on a rotary sample table and measured while being rotated. Such a measuring method can provide the result with the influence of orientation reduced.

As an apparatus for powder X-ray diffraction measurement, SmartLab manufactured by Rigaku is used, for example. Measurement is performed under the following condition:
Cu target
45 kV, 200 mA
soller slit: 5 degrees in both incident light and received light
step width (2θ): 0.02 deg
scan speed: 20 deg/min
semiconductor detector: D/teX Ultra 250
sample plate holder: flat glass sample plate holder (0.5 mm thick)
measurement range: range within 5°≤2θ≤90°

When another apparatus is used, in order to obtain measurement results equivalent to those described above, measurement using a standard Si powder for powder X-ray diffraction is performed, and measurement is conducted under conditions where a peak intensity and a peak top position correspond to those obtained using the above apparatus.

The X-ray diffraction (XRD) pattern obtained herein must be one applicable to Rietveld analysis. In order to collect data for Rietveld analysis, the measurement time or X-ray intensity is appropriately adjusted in such a manner that the step width is made 1/3 to 1/5 of the minimum half width of the diffraction peaks, and the intensity at the peak position of strongest reflected intensity is 5,000 cps or more.

The XRD pattern obtained as described above is analyzed by the Rietveld method. In the Rietveld method, the diffraction pattern is calculated from a crystal structure model that has been estimated in advance. The parameters of the crystal structure (lattice constant, atomic coordinate, crystal site occupancy ratio, or the like) can be precisely analyzed by fitting all the calculated values with the measured values. Thereby, the characteristics of the crystal structure of the synthesized composite oxide can be determined. Furthermore, the site occupancy ratio of constitutional elements in each of the sites can be determined. A fitting parameter S is used as the scale for estimating the degree of agreement between the measured intensities and the calculated intensities in the Rietveld analysis. The S value must be less than 1.8 in the analysis. When determining the occupancies in each of the sites, the standard deviation σj must be taken into consideration. The fitting parameter S and standard deviation σj defined herein are estimated using the formula described in "Funmatsu X sen Kaiseki no Jissai (Reality of Powder X-Ray Analysis)", X-Ray Analysis Investigation Conversazione, The Japan Society for Analytical Chemistry, written and edited by Izumi Nakai and Fujio Izumi (Asakura Publishing Co., Ltd.).

In the case where crystals having different space groups are included in the active material to be measured, the included amount of the space groups can be quantified by the Rietveld analysis. Specifically, information about the crystal structure is input for each different crystal phase, the information is fitted to the measured XRD pattern, and then the mass fraction is determined from the intensity information of each phase. More particularly, the amounts can be determined by the method described in Chapter 10: Section 5, "Calculation of Mass Fraction of Phases" in "Reality of Powder X-Ray Analysis", X-Ray Analysis Investigation Conversazione, The Japan Society for Analytical Chemistry, written and edited by Izumi Nakai and Fujio Izumi, Asakura Publishing Co., Ltd.

The information about the crystal structure of the measured active material can be obtained by the above method.

For example, in the case where the active material according to the first embodiment is measured as described above, the measured active material is found to have a composite oxide having a crystal structure belonging to a space group Fmmm. Further, when the measurement is performed as described above, even if a composite oxide having a crystal structure other than the crystal structure with a space group Fmmm is mixed, the included amounts can be calculated as the mass fraction.

On the other hand, in order to determine the previously described intensities $I_L$ and $I_H$ ($I_{L1}$ and $I_{H1}$) of diffraction peaks for the composite oxide, the powder X-ray diffraction results measured under the above conditions without any processing, i.e., raw data is used. In the X-ray diffraction pattern, the peak top, i.e., the maximum intensity of a strongest diffraction peak appearing within the range of 27.0°≤2θ≤31.0° is defined as $I_L$. On the other hand, the peak top; i.e., the maximum intensity of a strongest diffraction peak appearing within the range of 44.0°≤2θ≤46.0° is defined as $I_H$. An intensity ratio $I_H/I_L$ can be calculated by dividing the intensity numerical value (counts per second: cps) of the intensity $I_L$ by the intensity numerical value (cps) of the intensity $I_H$.

In the case where the composite oxide is found to have the symmetry of a space group Fmmm by the Rietveld analysis, the intensity $I_L$ is defined as the intensity $I_{L1}$ of a diffraction peak corresponding to a (113) plane, and the intensity $I_H$ is defined as the intensity $I_{H1}$ of a diffraction peak corresponding to a (024) plane. An intensity ratio $I_{H1}/I_{L1}$ can be calculated by dividing the intensity numerical value (counts per second: cps) of the intensity $I_{L1}$ by the intensity numerical value (cps) of the intensity $I_{H1}$.

When the target active material to be measured is included in the electrode material of a nonaqueous electrolyte battery, first, the electrode is taken out from the nonaqueous electrolyte battery according to the previously described procedure. The taken-out and washed electrode is cut to be of an area about equal to the area of the holder of a powder X-ray diffractometer, and used as the measurement sample.

The obtained measurement sample is affixed directly to the glass holder, and measured. In this case, the position of the peak originating from the electrode substrate such as a metal foil is measured in advance. The peaks of other components such as a conductive agent and a binder are also measured in advance. In such a case that the peaks of the substrate and active material overlap with each other, it is desirable that the layer including the active material (e.g., the later-described active material layer) is separated from the substrate, and subjected to measurement. This is in order to separate the overlapping peaks when quantitatively measuring the peak intensity. For example, the active material layer can be separated by irradiating the electrode substrate with an ultrasonic wave in a solvent. The active material layer is inserted into a capillary, mounted on a rotary sample table, and measured.

By such a method, the XRD pattern of the active material can be obtained with the influence of the orientation reduced.

<Method for Examining Composition of Composite Oxide>

The composition of the active material can be analyzed using Inductively Coupled Plasma (ICP) emission spectrometry, for example. In this case, the abundance ratios of elements depend on the sensitivity of an analyzing device to be used. Therefore, when the composition of an example of the active material according to the first embodiment is analyzed, for example, using ICP emission spectrometry, the numerical values may deviate due to errors of the measuring device from the previously described element ratios. However, even if the measurement results deviate as described above within the error range of the analyzing device, the example of the active material according to the first embodiment can sufficiently exhibit the previously described effects.

In order to measure the composition of the active material assembled into a battery according to ICP emission spectrometry, the following procedure is specifically performed. First, according to the previously described procedure, an electrode including the target active material to be measured is taken out from a nonaqueous electrolyte battery, and washed. The washed electrode is put in a suitable solvent, and irradiated with an ultrasonic wave. For example, an electrode is put into ethyl methyl carbonate in a glass beaker and the glass beaker is vibrated in an ultrasonic washing machine, and thereby an electrode layer including the electrode active material can be separated from a current collector. Next, the separated electrode layer is dried under reduced pressure. The obtained electrode layer is ground in a mortar or the like to provide a powder including the target active material, conductive auxiliary agent, and binder or the like. By dissolving the powder in an acid, a liquid sample including the active material can be prepared. At this time, hydrochloric acid, nitric acid, sulfuric acid, hydrogen fluoride, or the like can be used as the acid. The composition of the active material can be found by subjecting the liquid sample to ICP emission spectrometric analysis.

<Method for Examining Number of Valences of Constitutional Element in Composite Oxide>

The valence of elements included in active material particles can be analyzed by X-ray photoelectron spectroscopy (XPS) on the active material particles.

According to the X-ray photoelectron spectroscopy, elemental information about a surface of a substance is obtained from the binding energy value of bound electrons in the substance, and information about valence and binding state is obtained from the energy shift of each peak. In addition, quantitation can be carried out by using a peak area ratio. The X-ray photoelectron spectroscopy on the surface of the active material particles can be carried out as follows.

First, the electrode including the active material to be measured is taken out from the nonaqueous electrolyte battery according to the previously described procedure, and the taken-out electrode is washed. The washed electrode is cut into a size that fits within the holder of the XPS apparatus, and the obtained measurement sample is placed in an ultrahigh vacuum. In this state, the surface of the sample is irradiated with a soft X-ray, and a photoelectron released from the surface is detected by an analyzer. Since a distance for which the photoelectron can advance in a substance (average free path) is several nm, the detection depth in this analysis technique is several nm. A cross-section of the electrode can be cut out by ion milling, and the cut-out electrode can be subjected to the XPS analysis. Thereby, information about the inside of the active material can be obtained. It is desirable that the composite oxide according to the first embodiment is of the same state on the surface and inside of the particles.

However, as long as the composite oxide has a valence as according to the embodiment of the present application on the surface or on the inside within a range of several nm in the detecting depth-direction, the same effects can be obtained even if the valence distribution is not uniform.

<Method for Calculating Amount of Vacancies within Crystal of Composite Oxide>

The amount of vacancies in the composite oxide represented by the formula: $Li_{2+x}Na_{2-y}M_zTi_6O_{14+\delta}$ can be calculated as follows.

As described above, Inductively Coupled Plasma (ICP) emission spectrochemical analysis is first performed. Based on the result, the element ratio of Li:Na:M:Ti is examined. The numerical values of x, y, and z are calculated by matching this result to the formula.

The total valence is calculated with Li and Na in the composite oxide defined as monovalent Li and Na, and M defined as divalent M. On the other hand, the valence of Ti, which is a transition metal, is calculated according to the previously described procedure. Referring to the XPS chart, the peak near 457.1 eV indicates a trivalent state and the peak near 458.8 eV indicates a tetravalent state. Based on these peak intensities, a ratio $I_3/I_4$ of a tetravalent peak intensity $I_4$ and a trivalent peak intensity $I_3$ is determined. When this peak intensity ratio is within a range of $I_3/I_4<0.05$, Ti included in the composite oxide according to the first embodiment can act as a tetravalent Ti. Thus, an approximated calculation can be performed with the valence assumed as being plus 4. In the case of $I_3/I_4 \geq 0.05$, the average valence can be determined by obtaining a weighted average based on each peak intensity ratio and valence (formula 3).

$$3 \times I_3/(I_3+I_4)+4 \times I_4/(I_3+I_4) \quad (3)$$

Here, as an example, a calculation method in the case that the result of ICP emission spectroscopic analysis shows that the constituent element ratio is Li:Na:Mg:Ti=2:1.5:0.25:6, and the result of XPS shows that the valence of Ti is tetravalent. The total valence of constituent elements having a positive charge in the formula is (Li: 1×2)+(Na: 1×1.5)+(Mg: 2×0.25)+(Ti: 4×6)=28. As the total positive valence coincides with the valence of oxide ions having a negative charge (O: −2×14=−28), it can be seen that the charge neutrality is maintained. Further, in the formula, the total number of Li and Na sites of the composite oxide with the space group Fmmm is 4. Therefore, when the total number of the sites occupied by Li, Na, and M is subtracted from this numerical value, the obtained value is: 4−(2+1.5+0.25) =0.25. In other words, in this example, it had been determined that when the composite oxide is represented by the formula, the number of unoccupied sites, i.e., the amount of vacancies is 0.25.

In the case of $Li_2MTi_6O_{14}$ having symmetry of a space group Cmca, the sites occupied by Li and M are 3 in total. Accordingly, in the compound having the symmetry of the space group Cmca, calculation is performed under the assumption that all the occupied sites are filled, thereby, the amount of vacancies is 0.

According to a first embodiment, there is provided an active material including a composite oxide having an orthorhombic crystal structure belonging to a space group Fmmm. This composite oxide is represented by the formula: $Li_{2+x}Na_{2-y}M_zTi_6O_{14+\delta}$. This composite oxide can exhibit a large potential change in accordance with a change of capacity in a potential range of 1.0 V (vs. Li/Li$^+$) to 1.45 V (vs. Li/Li$^+$). In addition, the average operating potential of the composite oxide can be controlled by changing the Na amount. Further, the composite oxide can have a crystal structure in which lithium ions are easily inserted into and extracted from the crystal structure, and thus high reversible capacity during the charge-and-discharge and excellent life performance can be realized. As a result, when the active material according to the first embodiment is used as the active material for a battery, it is possible to realize a nonaqueous electrolyte battery which can exhibit a high energy density, a high battery voltage, and excellent life performance.

(Second Embodiment)

According to a second embodiment, a nonaqueous electrolyte battery is provided. This nonaqueous electrolyte battery includes a negative electrode that includes the active material according to the first embodiment as battery active material, a positive electrode, and a nonaqueous electrolyte.

The nonaqueous electrolyte battery according to the second embodiment can further include a separator provided between the positive electrode and the negative electrode. The negative electrode, the positive electrode, and the separator can compose an electrode group. The nonaqueous electrolyte may be held in the electrode group.

The nonaqueous electrolyte battery according to the second embodiment can further include a container member that houses the electrode group and the nonaqueous electrolyte.

The nonaqueous electrolyte battery according to the second embodiment can further include a negative electrode terminal electrically connected to the negative electrode and a positive electrode terminal electrically connected to the positive electrode. At least a part of the negative electrode terminal and at least a part of the positive electrode terminal may extend out to the exterior of the container member.

Hereinafter, the negative electrode, the positive electrode, the nonaqueous electrolyte, the separator, the container member, the negative electrode terminal, and the positive electrode terminal will be described in detail.

1) Negative Electrode

The negative electrode can include a current collector and a negative electrode layer (a negative electrode active material-including layer). The negative electrode layer can be formed on one surface or both of reverse surfaces of the current collector. The negative electrode layer can include a negative electrode active material, and optionally a conductive agent and a binder.

In a negative electrode using the active material according to the first embodiment, the average operating potential can be adjusted. Moreover, the active material according to the first embodiment can, as described above, exhibit high reversible capacity during charge-and-discharge, and exhibit excellent life performance. Therefore, in the nonaqueous electrolyte battery according to the second embodiment including such a negative electrode, a high energy density, a high battery voltage, and excellent life performance can be exhibited.

The negative electrode may use as the negative electrode active material, the active material according to the first embodiment singly, or use two or more kinds of active materials according to the first embodiment. Furthermore, a mixture where one kind or two or more kinds of the active material according to the first embodiment is further mixed with one kind or two or more kinds of another active material may also be used. Examples of other active materials include lithium titanate having a ramsdellite structure (e.g., $Li_2Ti_3O_7$), lithium titanate having a spinel structure (e.g., $Li_4Ti_5O_{12}$), monoclinic titanium dioxide ($TiO_2$), anatase type titanium dioxide, rutile type titanium dioxide, a hollandite type titanium composite oxide, an orthorhombic type Na-including titanium composite oxide (e.g., $Li_2Na_2Ti_6O_{14}$), a monoclinic niobium titanium composite oxide (e.g., $Nb_2TiO_7$), and the like.

The conductive agent is added to improve a current collection performance and to suppress the contact resistance between the negative electrode active material and the current collector. Examples of the conductive agent include carbonaceous substances such as vapor grown carbon fiber (VGCF), acetylene black, carbon black, and graphite. One of these may be included as the conductive agent, or two or more may be included in combination as the conductive agent. Furthermore, carbon coating or electron conducting inorganic material coating may be applied to the particle surface, in advance.

The binder is added to fill gaps among the dispersed negative electrode active material and also to bind the negative electrode active material with the current collector. Examples of the binder include polytetrafluoroethylene (PTFE), polyvinylidene fluoride (PVdF), fluorine rubber, styrene-butadiene rubber, polyacrylic acid compounds, and imide compounds. One of these may be included as the binder, or two or more may be included in combination as the binder.

The active material, conductive agent and binder in the negative electrode layer are preferably blended in proportions of 68% by mass to 96% by mass, 2% by mass to 30% by mass, and 2% by mass to 30% by mass, respectively. When the amount of conductive agent is 2% by mass or more, the current collection performance of the negative electrode layer can be improved. When the amount of binder is 2% by mass or more, binding between the negative electrode layer and current collector becomes sufficient, and excellent cycling performances can be expected. On the other hand, an amount of each of the conductive agent and binder is preferably 28% by mass or less, in view of increasing the capacity.

As the current collector, a material which is electrochemically stable at the lithium insertion and extraction potential of the negative electrode active material is used. The current collector is preferably made of copper, nickel, stainless steel, aluminum, or an aluminum alloy including one or more elements selected from Mg, Ti, Zn, Mn, Fe, Cu, and Si. The thickness of the current collector is preferably from 5 µm to 20 µm. The current collector having such a thickness can maintain balance between the strength and weight reduction of the negative electrode.

By using the battery active material according to the first embodiment, the density of the negative electrode layer (excluding the current collector) can be set in the range of 1.8 $g/cm^3$ to 2.8 $g/cm^3$. The negative electrode in which the density of the negative electrode layer is within this range can exhibit an excellent energy density, and at the same time, exhibit an excellent ability to hold the electrolyte solution. More preferably, the density of the negative electrode layer is 2.1 $g/cm^3$ to 2.6 $g/cm^3$.

The negative electrode is produced by, for example, suspending a negative electrode active material, a binder, and a conductive agent in a solvent used ordinarily to prepare a slurry, applying the slurry to a current collector, drying the coating to form a negative electrode layer, and then pressing the layer. The negative electrode may also be produced by forming a negative electrode active material, a binder, and a conductive agent into pellets as the negative electrode layer, and disposing the pellets onto a current collector.

2) Positive Electrode

The positive electrode can include a current collector and a positive electrode layer (positive electrode active material-including layer). The positive electrode layer may be formed on one surface or both of reverse surfaces of the current collector. The positive electrode layer can include a positive electrode active material, and optionally a conductive agent and a binder.

As the positive electrode active material, for example, an oxide or a sulfide may be used. The positive electrode may include one kind of positive electrode active material, or alternatively, include two or more kinds of positive electrode active materials. Examples of the oxide and sulfide include a compound capable of having Li inserted and extracted. Specific examples thereof include manganese dioxide ($MnO_2$), iron oxide, copper oxide, nickel oxide, lithium manganese composite oxide (e.g., $Li_xMn_2O_4$ or $Li_xMnO_2$), lithium nickel composite oxide (e.g., $Li_xNiO_2$), lithium cobalt composite oxide (e.g., $Li_xCoO_2$), lithium nickel cobalt composite oxide (e.g., $LiNi_{1-y}Co_yO_2$), lithium manganese cobalt composite oxide (e.g., $Li_xMn_yCo_{1-y}O_2$), lithium manganese nickel composite oxide having a spinel structure (e.g., $Li_xMn_{2-y}Ni_yO_4$), lithium phosphorus oxide having an olivine structure (e.g., $Li_xFePO_4$, $Li_xFe_{1-y}M_yPO_4$, and $Li_xCoPO_4$), iron sulfate ($Fe_2(SO_4)_3$), vanadium oxide (e.g., $V_2O_5$), and lithium nickel cobalt manganese composite oxide. In the above-described formulas, $0<x\leq1$, and $0<y\leq1$. As the active material, one of these compounds may be used singly, or plural compounds may be used in combination.

More preferred examples of the positive electrode active material include lithium manganese composite oxide having a spinel structure (e.g., $Li_xMn_2O_4$), lithium nickel composite oxide (e.g., $Li_xNiO_2$), lithium cobalt composite oxide (e.g., $Li_xCoO_2$), lithium nickel cobalt composite oxide (e.g., $LiNi_{1-y}Co_yO_2$), lithium manganese nickel composite oxide having a spinel structure (e.g., $Li_xMn_{2-y}Ni_yO_4$), lithium manganese cobalt composite oxide (e.g., $Li_xMn_yCo_{1-y}O_2$), lithium iron phosphate (e.g., $Li_xFePO_4$), and lithium nickel cobalt manganese composite oxide, which have a high positive electrode voltage. In the above-described formulas, $0<x\leq1$, and $0<y\leq1$.

When an ordinary temperature molten salt is used as the nonaqueous electrolyte of the battery, preferred examples of the positive electrode active material include lithium iron phosphate, $Li_xVPO_4F$ ($0\leq x\leq1$), lithium manganese composite oxide, lithium nickel composite oxide, and lithium nickel cobalt composite oxide. Since these compounds have low reactivity with ordinary temperature molten salts, cycle life can be improved.

The primary particle size of the positive electrode active material is preferably from 100 nm to 1 μm. The positive electrode active material having a primary particle size of 100 nm or more is easy to handle during industrial production. In the positive electrode active material having a primary particle size of 1 μm or less, diffusion of lithium ions within solid can proceed smoothly.

The specific surface area of the positive electrode active material is preferably 0.1 m²/g to 10 m²/g. The positive electrode active material having a specific surface area of 0.1 m²/g or more can secure sufficient sites for inserting and extracting Li ions. The positive electrode active material having a specific surface area of 10 m²/g or less is easy to handle during industrial production, and can secure a good charge and discharge cycle performance.

The binder is added to bind the positive electrode active material with the current collector. Examples of the binder include polytetrafluoroethylene (PTFE), polyvinylidene fluoride (PVdF), fluorine rubber, polyacrylic acid compounds, and imide compounds. One of these may be included as the binder, or two or more may be included in combination as the binder.

The conductive agent is added as necessary, in order to improve the current collection performance, and at the same time, suppress the contact resistance between the positive electrode active material and current collector.

Examples of the conductive agent include carbonaceous substances such as acetylene black, carbon black and graphite. One of these may be included as the conductive agent, or two or more may be included in combination as the conductive agent.

In the positive electrode layer, the positive electrode active material and binder are preferably included in proportions of 80% by mass to 98% by mass, and 2% by mass to 20% by mass, respectively.

When the amount of the binder is 2% by mass or more, sufficient electrode strength can be achieved. When the amount of the binder is 20% by mass or less, the amount of the insulator in the electrode can be reduced, and thereby the internal resistance can be decreased.

When a conductive agent is added, the positive electrode active material, binder, and conductive agent are preferably included in proportions of 77% by mass to 95% by mass, 2% by mass to 20% by mass, and 3% by mass to 15% by mass, respectively. When the amount of the conductive agent is 3% by mass or more, the above-described effects can be expressed. By setting the amount of the positive electrode conductive agent to 15% by mass or less, the decomposition of a nonaqueous electrolyte on the surface of the positive electrode conductive agent during high-temperature storage can be reduced.

The current collector is preferably an aluminum foil, or an aluminum alloy foil including one or more elements selected from Mg, Ti, Zn, Ni, Cr, Mn, Fe, Cu, and Si.

The thickness of the aluminum foil or aluminum alloy foil is preferably 5 μm to 20 μm, and more preferably 15 μm or less. The purity of the aluminum foil is preferably 99% by mass or more. The amount of the transition metal such as iron, copper, nickel, or chromium included in the aluminum foil or aluminum alloy foil is preferably 1% by mass or less.

The positive electrode is produced by, for example, suspending a positive electrode active material, a binder, and a conductive agent, which is added as necessary, in an appropriate solvent to prepare a slurry, applying the slurry to a positive electrode current collector, drying the coating to form a positive electrode layer, and then pressing the layer. The positive electrode may also be produced by forming an active material, a binder, and a conductive agent, which is added as necessary, into pellets as the positive electrode layer, and disposing the pellets onto a current collector.

3) Nonaqueous Electrolyte

The nonaqueous electrolyte may be, for example, a liquid nonaqueous electrolyte which is prepared by dissolving an electrolyte in an organic solvent, or gel like nonaqueous electrolyte which is a composite of a liquid electrolyte and a polymer material.

The liquid nonaqueous electrolyte is preferably prepared by dissolving an electrolyte in an organic solvent at a concentration of 0.5 mol/L to 2.5 mol/L.

Examples of the electrolyte include lithium salts such as lithium perchlorate ($LiClO_4$), lithium hexafluorophosphate ($LiPF_6$), lithium tetrafluoroborate ($LiBF_4$), lithium hexafluoroarsenate (LiAsF6), lithium trifluoromethanesulfonate ($LiCF_3SO_3$), and lithium bistrifluoromethylsulfonylimide [$LiN(CF_3SO_2)_2$], and mixtures thereof. The electrolyte is preferably resistant to oxidation even at a high potential, and most preferably $LiPF_6$.

Examples of the organic solvent include a cyclic carbonate such as propylene carbonate (PC), ethylene carbonate (EC), or vinylene carbonate (VC); a linear carbonate such as diethyl carbonate (DEC), dimethyl carbonate (DMC), or methyl ethyl carbonate (MEC); a cyclic ether such as tetrahydrofuran (THF), 2-methyl tetrahydrofuran (2-MeTHF), or dioxolane (DOX); a linear ether such as dimethoxy ethane (DME) or diethoxy ethane (DEE); γ-butyrolactone (GBL), acetonitrile (AN), and sulfolane (SL). These organic solvents may be used singularly or as a mixed solvent.

Examples of the polymeric material include polyvinylidene fluoride (PVdF), polyacrylonitrile (PAN), and polyethylene oxide (PEO).

Alternatively, the nonaqueous electrolyte may be, for example, an ordinary temperature molten salt (ionic melt) including lithium ions, a polymer solid electrolyte, or an inorganic solid electrolyte.

The ordinary temperature molten salt (ionic melt) means compounds among organic salts made of combinations of organic cations and anions, which are able to exist in a liquid state at ordinary temperature (15 to 25° C.). The ordinary temperature molten salt includes an ordinary temperature molten salt which exists alone as a liquid, an ordinary temperature molten salt which becomes a liquid upon mixing with an electrolyte, and an ordinary temperature molten salt which becomes a liquid when dissolved in an organic solvent. In general, the melting point of the ordinary temperature molten salt used in nonaqueous electrolyte batteries is 25° C. or below. The organic cations generally have a quaternary ammonium framework.

The polymer solid electrolyte is prepared by dissolving the electrolyte in a polymeric material, and solidifying it.

The inorganic solid electrolyte is a solid substance having Li ion conductivity.

4) Separator

The separator may be made of, for example, a porous film or synthetic resin nonwoven fabric including polyethylene, polypropylene, cellulose, or polyvinylidene fluoride (PVdF). Among these, a porous film formed from polyethylene or polypropylene melts at a fixed temperature and thus able to shut off a current, therefore the porous film can improve safety.

5) Container Member

As the container member, for example, a laminate film having a thickness of 0.5 mm or less, or a metal case having a wall thickness of 1 mm or less may be used. The thickness of the laminate film is more preferably 0.2 mm or less. The wall thickness of the metal case is more preferably 0.5 mm or less, and still more preferably 0.2 mm or less.

The shape of the container member is not particularly limited, and may be, for example, flat (thin), square, cylinder, coin, or button-shaped. The container member depends on the size of the battery, and may be that for a compact battery mounted on mobile electronic devices, or a large battery mounted on vehicles such as two- to four-wheel automobiles.

As the laminate film, used is a multilayer film including resin layers and a metal layer sandwiched between the resin layers. The metal layer is preferably an aluminum foil or an aluminum alloy foil, so as to reduce weight. The resin layer may be, for example, a polymeric material such as polypropylene (PP), polyethylene (PE), nylon, or polyethylene terephthalate (PET). The laminate film may be heat-sealed to be formed into the shape of a container member.

The metal case is made of aluminum or an aluminum alloy, for example. As the aluminum alloy, an alloy including one or more of an element such as magnesium, zinc, or silicon is preferable. If a transition metal such as iron, copper, nickel, or chromium is included in the alloy, the included amount thereof is preferably set to 1% by mass or less.

6) Negative Electrode Terminal and Positive Electrode Terminal

The negative electrode terminal may be made of a material that is electrochemically stable at the potential at which Li is inserted into and extracted from the above-described negative electrode active material, and has electrical conductivity. Specific examples of the material for the negative electrode terminal include copper, nickel, stainless steel, or aluminum. The negative electrode terminal is preferably made of the same material as the negative electrode current collector in order to reduce the contact resistance with the negative electrode current collector.

The positive electrode terminal may be made of, for example, a material that has electrical stability in the potential range of 3 V to 5 V (vs. Li/Li$^+$) relative to the oxidation-and-reduction potential of lithium, and electrical conductivity. Specifically, the positive electrode terminal is made of aluminum or an aluminum alloy including one or more of Mg, Ti, Zn, Mn, Fe, Cu, Si, or the like. The positive electrode terminal is preferably made of the same material as the positive electrode current collector in order to reduce contact resistance with the positive electrode current collector.

Next, the nonaqueous electrolyte battery according to the second embodiment will be more specifically described with reference to the drawings.

First, an example of the nonaqueous electrolyte battery according to the second embodiment will be described with reference to FIGS. 2 and 3.

Figure 2:
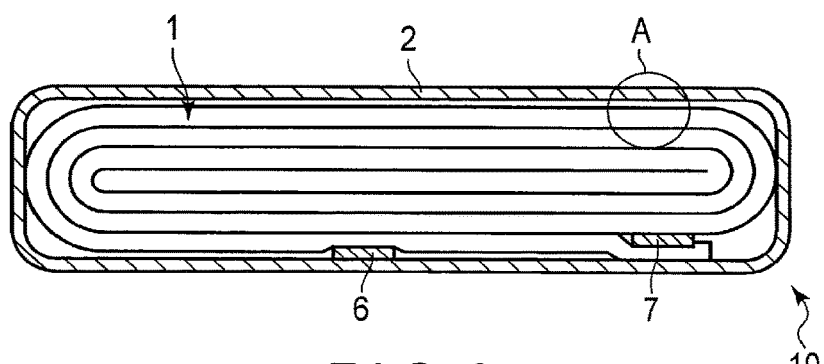
FIG. 2 is a cross-sectional view of an example of a nonaqueous electrolyte battery according to a second embodiment.

FIG. 2 is a cross-sectional view of an example of a nonaqueous electrolyte battery according to the second embodiment. FIG. 3 is an enlarged cross-sectional view showing a portion A in FIG. 2.

Figure 3:
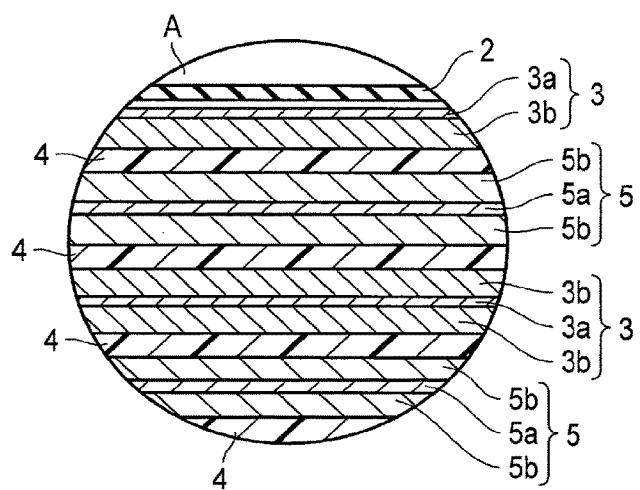
FIG. 3 is an enlarged cross-sectional view showing a portion A in FIG. 2.

A nonaqueous electrolyte battery 10 shown in FIGS. 2 and 3 includes a bag-shaped container member 2 shown in FIG. 2, an electrode group 1 shown in FIGS. 2 and 3, and a nonaqueous electrolyte (not shown). The electrode group 1 and the nonaqueous electrolyte are housed in the container member 2. The nonaqueous electrolyte is held in the electrode group 1.

The bag shaped container member 2 is made of a laminate film including two resin layers and a metal layer sandwiched between the resin layers.

As shown in FIG. 2, the electrode group 1 is a wound electrode group in a flat form. The wound electrode group 1 in a flat form is formed by, spirally winding a stack where stacked, in order from the outside, are a negative electrode 3, a separator 4, a positive electrode 5, and a separator 4, as shown in FIG. 3, and then press-forming the wound stack.

The negative electrode 3 includes a negative electrode current collector 3a and a negative electrode layer 3b. In the negative electrode layer 3b, the active material according to the first embodiment is included. The negative electrode 3 on the outermost layer has a configuration in which a negative electrode layer 3b is formed only on one side which is the internal surface of a negative electrode current collector 3a, as shown in FIG. 3. For the other negative electrode 3, the negative electrode layers 3b are formed on both of reverse surfaces of the negative electrode current collector 3a.

The positive electrode 5 includes a positive electrode current collector 5a and positive electrode layers 5b formed on both of reverse surfaces of the positive electrode current collector 5a.

As shown in FIG. 2, in the vicinity of the outer peripheral edge of the wound electrode group 1, a negative electrode terminal 6 is connected to the negative electrode current collector 3a in the outermost negative electrode 3, and a positive electrode terminal 7 is connected to the positive electrode current collector 5a in the positive electrode 5 on the inner side. The negative electrode terminal 6 and the positive electrode terminal 7 are extended out from the opening of the bag shaped container member 2.

The nonaqueous electrolyte battery 10 shown in FIGS. 2 and 3 can be produced according to the following procedure, for example. First, an electrode group 1 is produced. The electrode group 1 is then enclosed in a bag-shaped container member 2. Upon which, one ends of each the negative electrode terminal 6 and positive electrode terminal 7 are made to protrude outside the container member 2. Next, the circumference of the container member 2 is heat-sealed with a portion left unsealed. Next, from a portion that had not been heat-sealed, for example, a liquid nonaqueous electrolyte is poured in via the opening of the bag shaped container member 2. Finally, the opening is heat-sealed, and thereby the wound electrode group 1 and the liquid nonaqueous electrolyte are completely sealed.

Figure 4:
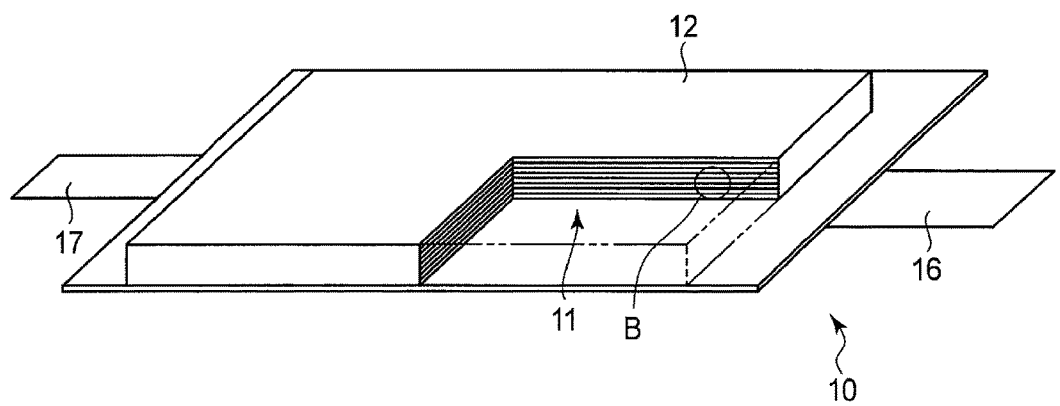
FIG. 4 is a partially cut-out perspective view schematically showing another example of a nonaqueous electrolyte battery according to the second embodiment.

The nonaqueous electrolyte battery according to the second embodiment is not limited to the example nonaqueous electrolyte secondary battery shown above in FIGS. 2 and 3, and may be, for example, a battery configured as shown in FIGS. 4 and 5.

FIG. 4 is a partially cut-out perspective view schematically showing another example of a nonaqueous electrolyte battery according to the second embodiment.

FIG. 5 is an enlarged cross-sectional view showing a portion B in FIG. 4.

A nonaqueous electrolyte battery 10 shown in FIGS. 4 and 5 includes an electrode group 11 shown in FIGS. 4 and 5, a container member 12 shown in FIG. 4, and a nonaqueous electrolyte (not shown). The electrode group 11 and the nonaqueous electrolyte are housed in the container member 12. The nonaqueous electrolyte is held in the electrode group 11.

The container member 12 is made of a laminate film including two resin layers and a metal layer sandwiched between the resin layers.

As shown in FIG. 5, the electrode group 11 is a stacked electrode group. As shown in FIG. 5, the stacked electrode group 11 has a structure in which positive electrodes 13 and negative electrodes 14 are alternately stacked with a separator 15 sandwiched therebetween.

The electrode group 11 includes plural positive electrodes 13. Each of the plural positive electrodes 13 includes a positive electrode current collector 13a, and positive electrode layers 13b supported on both of reverse surfaces of the positive electrode current collector 13a. The electrode group 11 includes plural negative electrodes 14. Each of the plural negative electrodes 14 includes a negative electrode current collector 14a, and negative electrode layers 14b supported on both of reverse surfaces of the negative electrode current collector 14a. An end of the negative electrode current collector 14a of each of the negative electrodes 14 protrudes out from the negative electrode 14. The protruded negative electrode current collector 14a is electrically connected to a strip-shaped negative electrode terminal 16. The tip of the strip-shaped negative electrode terminal 16 is extended out from the container member 12. Although not shown in the drawings, an end of the positive electrode current collector 13a of the positive electrodes 13 protrude from the positive electrodes 13 at the side opposed to the protruded end of the negative electrode current collector 14a. The positive electrode current collector 13a protruding from the positive electrode 13 is electrically connected to a strip-shaped positive electrode terminal 17. The tip of the strip-shaped positive electrode terminal 17 is positioned on the opposite side from the negative electrode terminal 16, and extended out from a side of the container member 12.

The nonaqueous electrolyte battery according to the second embodiment includes the active material according to the first embodiment as a battery active material. For this reason, the nonaqueous electrolyte battery according to the second embodiment can exhibit a high energy density, a high battery voltage, and excellent life performance. In the nonaqueous electrolyte battery, the potential changes smoothly, for example, within a potential range of 2.3 V to 3.0 V, and thus the voltage can be managed easily.

In addition, when the nonaqueous electrolyte battery is, for example, combined with a 12 V lead storage battery for automobiles to thereby construct a motor assist type hybrid car or an idling stop system, it is possible to design a setting of battery pack potential that is capable of preventing over-discharge of a lead storage battery upon a high load or is capable of adapting to a potential fluctuation upon an input of regenerative energy. This is because, in the end period of discharge of the nonaqueous electrolyte battery of the second embodiment, the decrease in voltage is smooth. Since the voltage changes smoothly in accordance with the charge-and-discharge of the nonaqueous electrolyte battery, the state-of-charge (SOC) can be managed based on the voltage change. Accordingly, the voltage in the end period of discharge can be easily managed, and the nonaqueous electrolyte battery can be favorably used in a system where the battery is combined with the lead storage battery.

Further, in the case where a spinel lithium titanate ($Li_4Ti_5O_{12}$) is used for the negative electrode, the average operating potential is low. Thus, it is necessary to connect six batteries in series, in order to obtain a voltage compatible with a lead storage battery for automobiles. On the other hand, when the active material of the first embodiment is used as the negative electrode active material, the average operating potential of the negative electrode is decreased, and the battery voltage is increased. Thus, even if the number of the batteries connected in series in the battery pack is changed to five, a battery pack capable of exhibiting a voltage compatible with the 12 V lead storage battery for automobiles can be constructed. Hence, the nonaqueous electrolyte battery according to the second embodiment is able to provide a small size battery pack capable of exhibiting a low resistance and a high energy density at a low cost.

(Third Embodiment)

According to a third embodiment, a battery pack is provided. The battery pack includes the nonaqueous electrolyte battery according to the second embodiment.

The battery pack according to the third embodiment may include one or more nonaqueous electrolyte batteries (unit cells) according to the second embodiment described above. The plural nonaqueous electrolyte batteries, which may be included in the battery pack according to the third embodiment, may be electrically connected in series, in parallel, or in a combination of in a series and in parallel. The plural nonaqueous electrolyte batteries may be electrically connected in series or in parallel, to structure a battery module. The battery pack according to the third embodiment may include plural battery modules.

The battery pack according to the third embodiment may further include a protective circuit. The protective circuit has a function to control charging and discharging of the nonaqueous electrolyte battery. Alternatively, a circuit included in equipment where the battery pack serves as a power source (for example, electronic devices, vehicles, and the like) may be used as the protective circuit for the battery pack.

Moreover, the battery pack according to the third embodiment may further comprise an external power distribution terminal. The external power distribution terminal is configured to externally output current from the nonaqueous electrolyte battery, and to input current to the nonaqueous electrolyte battery. In other words, when the battery pack is used as a power source, the current is externally provided via the external power distribution terminal. When the battery pack is charged, the charging current (including regenerative energy caused by power of vehicles such as automobiles) is provided to the battery pack via the external power distribution terminal.

Next, an example of a battery pack according to the third embodiment will be described with reference to the drawings.

Figure 6:
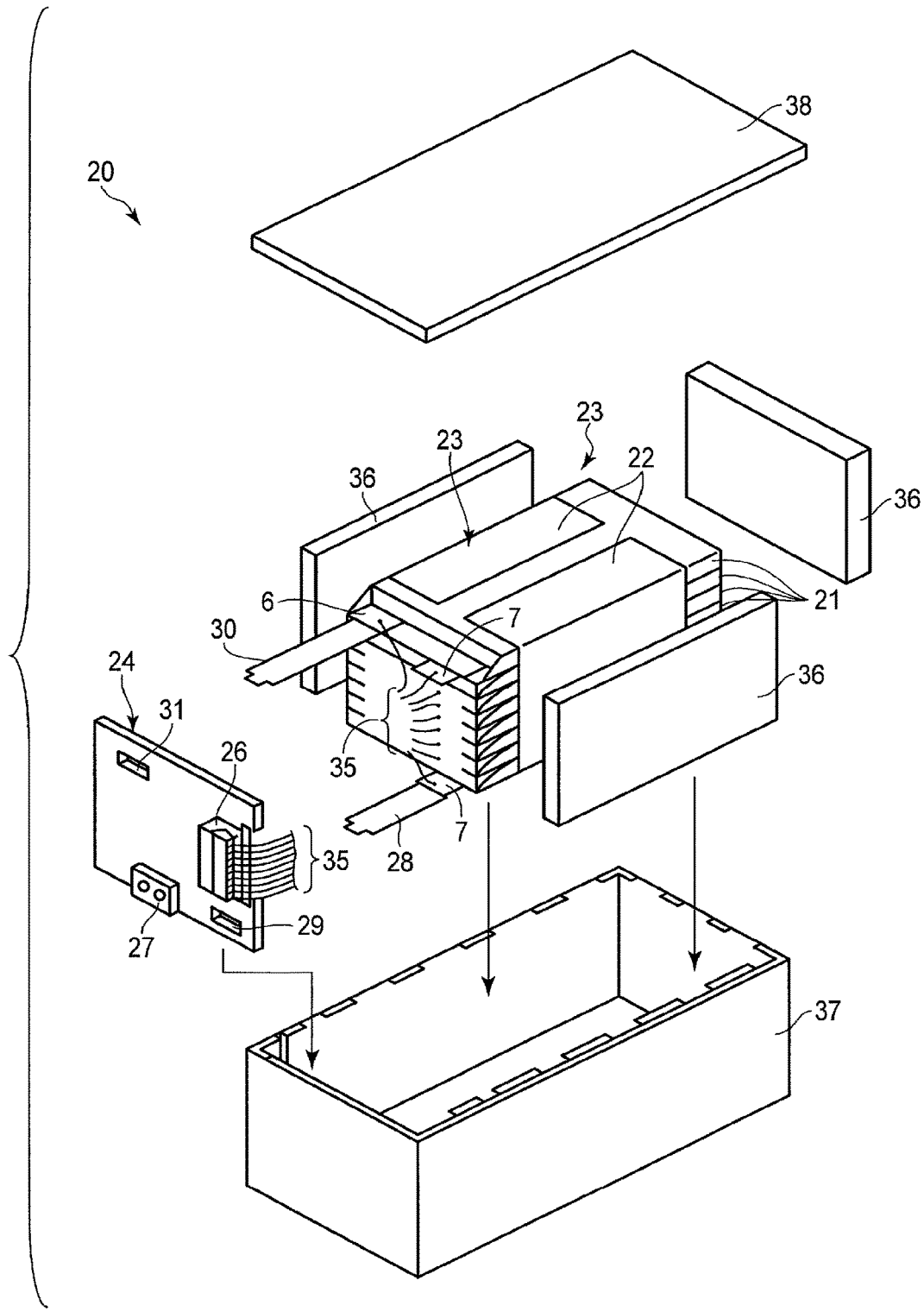
FIG. 6 is an exploded perspective view of an example of the battery pack according to a third embodiment.

FIG. 6 is an exploded perspective view of an example of the battery pack according to the third embodiment. FIG. 7 is a block diagram showing an electric circuit of the battery pack of FIG. 6.

A battery pack 20 shown in FIGS. 6 and 7 includes plural unit cells 21. The plural unit cells 21 are flat nonaqueous electrolyte batteries 10 described with reference to FIGS. 2 and 3.

Plural unit cells 21 are stacked so that the negative electrode terminals 6 and the positive electrode terminals 7 extended outside are arranged in the same direction, and fastened with an adhesive tape 22 to configure a battery module 23. The unit cells 21 are electrically connected to each other in series as shown in FIG. 7.

A printed wiring board 24 is arranged to face toward the side plane of the battery module 23 where the negative electrode terminal 6 and the positive electrode terminal 7 extend out from. A thermistor 25, a protective circuit 26, and an external power distribution terminal 27 are mounted on the printed wiring board 24 as shown in FIG. 7. An electric insulating plate (not shown) is attached to the surface of the printed wiring board 24 facing the battery module 23 to avoid unnecessary connection of the wires of the battery module 23.

A positive electrode-side lead 28 is connected to the positive electrode terminal 7 located at the bottom layer of the battery module 23 and the distal end of the lead 28 is inserted into a positive electrode-side connector 29 of the printed wiring board 24 so as to be electrically connected. A negative electrode-side lead 30 is connected to the negative electrode terminal 6 located at the top layer of the battery module 23 and the distal end of the lead 30 is inserted into an negative electrode-side connector 31 of the printed wiring board 24 so as to be electrically connected. The connectors 29 and 31 are connected to the protective circuit 26 through wires 32 and 33 formed on the printed wiring board 24.

The thermistor 25 detects the temperature of the unit cells 21, and the detection signal is sent to the protective circuit 26. The protective circuit 26 can shut down a plus-side wire 34a and a minus-side wire 34b between the protective circuit 26 and the external power distribution terminal 27, under a predetermined condition. The predetermined condition indicates, for example, the case where the temperature detected by the thermistor 25 becomes a predetermined temperature or more. Another example of the predetermined condition is when over-charge, over-discharge, or over-current of the unit cells 21 is detected. The detection of the over-charge and the like is performed on each of the unit cells 21 or the entire battery module 23. When each of the unit cells 21 is detected, the cell voltage may be detected, or positive electrode or negative electrode potential may be detected. In the latter case, a lithium electrode to be used as a reference electrode is inserted into each of the unit cells 21. In the case of the battery pack 20 of FIGS. 6 and 7, wires 35 for voltage detection are connected to each of the unit cells 21. Detection signals are sent to the protective circuit 26 through the wires 35.

Protective sheets 36 made of rubber or resin are arranged on three side planes of the battery module 23 except the side plane from which the positive electrode terminal 7 and the negative electrode terminal 6 protrude out.

The battery module 23 is housed in a housing container 37 together with each of the protective sheets 36 and the printed wiring board 24. That is, the protective sheets 36 are arranged on both internal surfaces in a long side direction and on one internal surface in a short side direction of the housing container 37. The printed wiring board 24 is arranged on the internal surface on the opposite side in a short side direction. The battery module 23 is located in a space surrounded by the protective sheets 36 and the printed wiring board 24. A lid 38 is attached to the upper surface of the housing container 37.

In order to fix the battery module 23, a heat-shrinkable tape may be used in place of the adhesive tape 22. In this case, the battery module is bound by placing the protective sheets on the both sides of the battery module, revolving the heat-shrinkable tape, and thermally shrinking the heat-shrinkable tape.

In FIGS. 6 and 7, an embodiment has been shown where plural unit cells 21 are connected in series; however, the connection may be made in parallel in order to increase battery capacity. Alternatively, connection in series may be combined with connection in parallel. Assembled battery packs may be connected further in series or in parallel.

Furthermore, although the battery pack shown in FIGS. 6 and 7 include plural unit cells 21, the battery pack according to the third embodiment may include only one unit cell 21.

The aspect of the battery pack according to the third embodiment may be appropriately changed depending on its application. The battery pack according to the third embodiment can be suitably used in applications in which cycle performance is demanded to be excellent when large current is taken out. Specifically the battery pack is used as a power source of a digital camera, or for example, a battery for mounting on a vehicle such as a two- to four-wheeled hybrid electric automobile, a two- to four-wheeled electric automobile or a power-assisted bicycle. In particular, the battery pack is suitably used for a battery mounted on a vehicle.

In a vehicle including the battery pack according to the third embodiment, the battery pack is configured, for example, to recover regenerative energy caused by power of the vehicle. Examples of the vehicle include two to four-wheeled hybrid electric automobiles, two to four-wheeled electric automobiles, electric assist bicycles, and electric trains.

Figure 12:
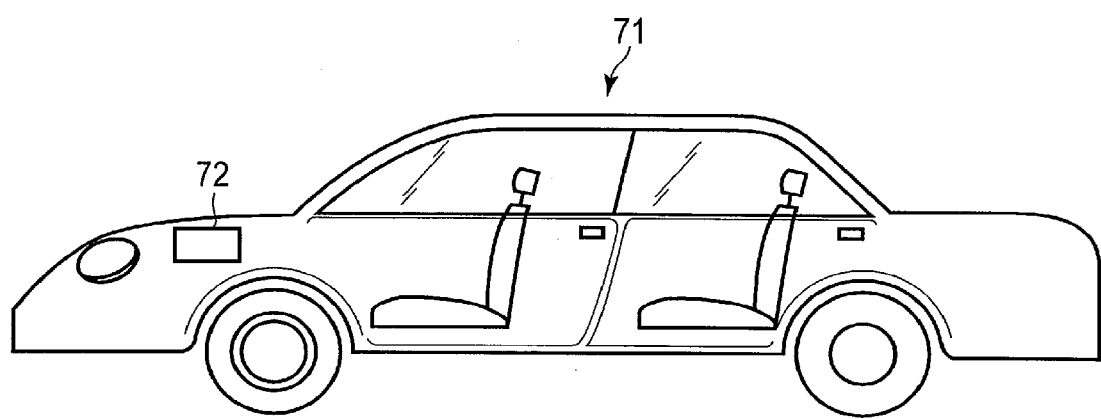
FIG. 12 is a schematic diagram showing an example of an automobile including the battery pack according to the third embodiment.

FIG. 12 shows an example of an automobile that includes a battery pack according to the third embodiment.

The automobile 71 shown in FIG. 12 includes a battery pack 72, which is an example of the battery pack according to the third embodiment, mounted in its engine room. The mounting position is not limited to engine rooms. For example, the battery pack may also be mounted in rear parts of automobiles or under seats.

The battery pack according to the third embodiment includes the nonaqueous electrolyte battery according to the second embodiment. Thus, the battery pack according to the third embodiment can exhibit a high energy density, high battery voltage, and excellent life performance, and in addition, voltage management can be performed easily.

In the nonaqueous electrolyte battery according to the second embodiment, the potential changes smoothly within a potential range of 2.3 V to 3.0 V, as described above. Thus, when five of the nonaqueous electrolyte batteries are connected in series to form a battery module, a battery pack having an operating potential in a high range of 15.1 V to 11.5 V can be constructed. In such a battery pack, the voltage decreases smoothly in the end period of discharge. Accordingly, the state-of-charge (SOC) of the battery pack can be managed based on the voltage change, and the voltage in the end period of discharge can be easily managed. As a result, the battery pack has favorable compatibility with the 12 V lead storage battery for automobiles.

EXAMPLES

Hereinafter, the above embodiments will be described in more detail with reference to Examples. The identification of a crystal phase of synthesized orthorhombic composite oxides and the estimation of crystal structure were performed by the powder X-ray diffraction using Cu-Kα rays, as described above. In addition, the composition of products was analyzed by the above-described ICP method to examine that a target product was obtained.

(Synthesis)

Examples 1 to 11

In Examples 1 to 11, products of Examples 1 to 11 were synthesized according to the procedures of the production method of the first embodiment. Target compositions of Examples 1 to 11 are shown in Table 1 below.

Specifically, synthesis was performed in the following manner. First, commercially available oxide and carbonate reagents (Li, Na, M, and Ti sources) shown in Table 1 below were provided as starting materials so that molar ratios shown in Table 1 were satisfied and the total weight was 50 g. As a result of analyzing the vaporized amount of lithium during calcining in a preliminary experiment, the vaporized amount was determined to be equivalent to 3% in terms of lithium carbonate. Therefore, lithium carbonate was provided in an amount 3% in excess relative to the target composition.

Next, the starting materials, provided as above, were mixed, and the mixture was put in an agate pod (a volume of 300 ml) for a ball mill. Agate balls having a diameter of 10 mm or 5 mm were put in the pod in a number ratio of 1:1, such that one third of the pod volume was filled. After that, 50 ml of ethanol was added to the pod, and the mixture was wet-mixed at 120 rpm for 60 minutes to obtain a mixture.

Next, the thus obtained mixture was put in an electric furnace, and a heat treatment was performed by the following procedures.

First, pre-calcination was performed at a temperature of 650° C. for 6 hours in air. Next, a powder obtained by pre-calcination was taken out from the furnace, and the powder was reground and mixed.

The thus obtained mixture was subsequently subjected to first-calcination at a temperature of 900° C. for 6 hours. After the calcination, the calcined powder was taken out from the furnace, and the calcined powder was mixed again.

Subsequently, the re-mixed calcined powder was put in the furnace, and second-calcination was performed at a temperature of 900° C. for 6 hours in air. After that, in order to obtain the target crystal structure, the temperature in the electric furnace was held at 400° C. for 2 hours, and then was quickly cooled to room temperature. Next, the calcined powder was taken out from the furnace, and the calcined powder was mixed again. The powder obtained after the second-calcination, i.e., as a result of calcining at a temperature of 900° C. for a total of 12 hours and annealing at 400° C., was used as each of products of Examples 1 to 11.

Example 12

In Example 12, a product of Example 12 was synthesized in the same manner as in Example 2 except that calcination was performed in a reducing atmosphere by flowing nitrogen gas including 3% hydrogen through the electric furnace.

TABLE 1

|  | Composition | Li source/amount | Na source/amount | M source/amount | Ti source/amount |
|---|---|---|---|---|---|
| Comparative Example 1 | $Li_2Na_2Ti_6O_{14}$ | $Li_2CO_3/1.0$ | $Na_2CO_3/1.0$ | — | $TiO_2/6.0$ |
| Comparative Example 2 | $Li_{2.1}Na_{1.9}Ti_6O_{14}$ | $Li_2CO_3/1.05$ | $Na_2CO_3/0.95$ | — | $TiO_2/6.0$ |
| Comparative Example 3 | $Li_{1.9}Na_2Mg_{0.1}Ti_6O_{14}$ | $Li_2CO_3/0.95$ | $Na_2CO_3/1.0$ | $MgO/0.1$ | $TiO_2/6.0$ |
| Comparative Example 4 | $Li_2Mg_{0.5}Ca_{0.5}Ti_6O_{14}$ | $Li_2CO_3/1.0$ | — | $MgO/0.5$ $CaCO_3/0.5$ | $TiO_2/6.0$ |
| Example 1 | $Li_2Na_{1.99}Mg_{0.005}Ti_6O_{14}$ | $Li_2CO_3/1.0$ | $Na_2CO_3/0.995$ | $MgO/0.005$ | $TiO_2/6.0$ |
| Example 2 | $Li_2Na_{1.9}Mg_{0.05}Ti_6O_{14}$ | $Li_2CO_3/1.0$ | $Na_2CO_3/0.95$ | $MgO/0.05$ | $TiO_2/6.0$ |
| Example 3 | $Li_2Na_{1.8}Mg_{0.1}Ti_6O_{14}$ | $Li_2CO_3/1.0$ | $Na_2CO_3/0.9$ | $MgO/0.1$ | $TiO_2/6.0$ |
| Example 4 | $Li_2Na_{1.75}Mg_{0.125}Ti_6O_{14}$ | $Li_2CO_3/1.0$ | $Na_2CO_3/0.875$ | $MgO/0.125$ | $TiO_2/6.0$ |
| Example 5 | $Li_2Na_{1.5}Mg_{0.25}Ti_6O_{14}$ | $Li_2CO_3/1.0$ | $Na_2CO_3/0.75$ | $MgO/0.25$ | $TiO_2/6.0$ |
| Example 6 | $Li_2NaMg_{0.5}Ti_6O_{14}$ | $Li_2CO_3/1.0$ | $Na_2CO_3/0.5$ | $MgO/0.5$ | $TiO_2/6.0$ |
| Example 7 | $Li_2Na_{0.2}Mg_{0.9}Ti_6O_{14}$ | $Li_2CO_3/1.0$ | $Na_2CO_3/0.1$ | $MgO/0.9$ | $TiO_2/6.0$ |
| Example 8 | $Li_2Na_{1.8}Sr_{0.1}Ti_6O_{14}$ | $Li_2CO_3/1.0$ | $Na_2CO_3/0.9$ | $SrCO_3/0.1$ | $TiO_2/6.0$ |
| Example 9 | $Li_2Na_{1.8}Ca_{0.1}Ti_6O_{14}$ | $Li_2CO_3/1.0$ | $Na_2CO_3/0.9$ | $CaCO_3/0.1$ | $TiO_2/6.0$ |
| Example 10 | $Li_2Na_{1.8}Ba_{0.1}Ti_6O_{14}$ | $Li_2CO_3/1.0$ | $Na_2CO_3/0.9$ | $BaCO_3/0.1$ | $TiO_2/6.0$ |
| Example 11 | $Li_{2.2}Na_{1.7}Mg_{0.05}Ti_6O_{14}$ | $Li_2CO_3/1.0$ | $Na_2CO_3/0.85$ | $MgO/0.05$ | $TiO_2/6.0$ |
| Example 12 | $Li_2Na_{1.9}Mg_{0.05}Ti_6O_{13.5}$ | $Li_2CO_3/1.0$ | $Na_2CO_3/0.95$ | $MgO/0.05$ | $TiO_2/6.0$ |

Example 13

In Example 13, a product of Example 13 was synthesized according to the following procedure.

First, a part of the product of Example 2 was immersed into a sucrose aqueous solution having a concentration adjusted to 10% by weight. Then, the sucrose solution was filtered. After that, the filtered residue was heated at 700° C. for 2 hours in a nitrogen atmosphere. The product obtained by the heating was used as the product of Example 13.

The product of Example 13 was analyzed by transmission electron microscopy and energy dispersive X-ray spectroscopy (TEM-EDX). As a result, this product was found to be equivalent to the product of Example 2 having carbon coated on the surface of the particles thereof.

Example 14

In Example 14, a product of Example 14 was synthesized by coating the surface of the product of Example 2 with lithium titanate $Li_4Ti_5O_{12}$ using a tumbling fluidized bed granulator according to the following procedures.

Specifically, first, lithium ethoxide and titanium tetraisopropoxide were mixed in a molar ratio of Li:Ti of 4:5 to prepare a sol-gel liquid. Next, the prepared sol-gel liquid was sprayed onto a part of the product of Example 2 in the tumbling fluidized bed granulator. Thus a composite in which the sol-gel liquid was adhered to the particle surface was obtained. The composite was calcined at 600° C. for 2 hours in air. As a result of the calcination, the sol-gel liquid was converted into a spinel lithium titanate. The thus obtained product was used as the product of Example 14.

The product of Example 14 was analyzed by TEM-EDX and electron beam diffraction. As a result, this product was found to be equivalent to the product of Example 2 having a layer of spinel lithium titanate $Li_4Ti_5O_{12}$ coated on the surface of the particle thereof.

Comparative Examples 1 to 3

In Comparative Examples 1 to 3, compounds were synthesized according to the compositions and the synthesis method described in "Journal of Power Sources 297 (2015) pp. 283-294". The starting materials and the molar ratios were as described in the above Table 1.

Comparative Example 4

In Comparative Example 4, a compound was synthesized according to the compositions and the synthesis method described in Jpn. Pat. Appln. KOKAI Publication No. 2005-267940. The starting materials and the molar ratios were as described in the above Table 1.

(Examination of Composition of Product)

The compositions of the products of Examples 1 to 12 and the products of Comparative Examples 1 to 4 were analyzed according to the ICP method described above. Further, the valence of Ti included in the crystal structure was investigated by XPS. Based on the result, numerical values were assigned to x, y, z, and δ in the formula and the amount of vacancies was calculated. The results are shown in Table 2 below.

As shown in Table 2, the product of Example 12 had a subscript δ of oxygen in the composition formula of −0.5. An intensity ratio $I_3/I_4$ was 0.19, which was obtained by XPS. Here, $I_4$ is a peak intensity of tetravalent Ti and $I_3$ is a peak intensity of trivalent Ti. Thus, the average valence of Ti was calculated and the value was 3.84. Assuming that the charge neutrality of the product of Example 12 is maintained, it was found based on the molar ratio and valence of the constituent elements that the number of moles of oxygen is 13.5. Hence, in the product of Example 12, slight oxygen deficiency (δ=−0.5) had occurred relative to Example 2.

TABLE 2

| | x | y | z | δ | Valence of Ti | Vacancy amount |
|---|---|---|---|---|---|---|
| Comparative Example 1 | 0 | 0 | 0 | 0 | 4.0 | 0 |
| Comparative Example 2 | 0.1 | 0.1 | 0 | 0 | 4.0 | 0 |
| Comparative Example 3 | −0.1 | 0 | 0.1 | 0 | 4.0 | 0 |
| Comparative Example 4 | 0 | 2.0 | 1.0 | 0 | 4.0 | 0 |
| Example 1 | 0 | 0.01 | 0.005 | 0 | 4.0 | 0.005 |
| Example 2 | 0 | 0.1 | 0.05 | 0 | 4.0 | 0.05 |
| Example 3 | 0 | 0.2 | 0.1 | 0 | 4.0 | 0.1 |
| Example 4 | 0 | 0.25 | 0.125 | 0 | 4.0 | 0.125 |
| Example 5 | 0 | 0.5 | 0.25 | 0 | 4.0 | 0.25 |
| Example 6 | 0 | 1.0 | 0.5 | 0 | 4.0 | 0.5 |
| Example 7 | 0 | 1.8 | 0.9 | 0 | 4.0 | 0.9 |
| Example 8 | 0 | 0.2 | 0.1 | 0 | 4.0 | 0.1 |
| Example 9 | 0 | 0.2 | 0.1 | 0 | 4.0 | 0.1 |
| Example 10 | 0 | 0.2 | 0.1 | 0 | 4.0 | 0.1 |
| Example 11 | 0.2 | 0.3 | 0.05 | 0 | 4.0 | 0.05 |
| Example 12 | 0 | 0.1 | 0.05 | −0.5 | 3.84 | 0.05 |

(Powder X-Ray Diffraction Measurement)

The products of Examples 1 to 12 and the products of Comparative Examples 1 to 4 were subjected to the powder X-ray diffraction measurement according to the procedure described above.

A crystal plane index corresponding to a strongest diffraction peak L appearing in a range of 27.0°≤2θ≤31.0°; a value $2θ_L$ of 2θ of the diffraction peak L; a crystal plane index corresponding to a strongest diffraction peak H appearing in a range of 44.0°≤2θ≤46.0°; and a value $2θ_H$ of 2θ of the diffraction peak H were obtained from the results of the powder X-ray diffraction measurement of each product. Table 3 below shows these values $2θ_L$ and $2θ_H$ and an intensity ratio $I_H/I_L$ of these diffraction peaks.

The results of the powder X-ray diffraction were analyzed according to a Rietveld method. As a result, it was found that the products obtained in Examples 1 to 12 were orthorhombic compounds having the space group Fmmm symmetry shown in FIG. 1. Crystal phases and space groups of the products are shown in Table 3 altogether. The products obtained in Examples 1 to 12 have the space group Fmmm symmetry, thus for Examples 1 to 12, the diffraction intensity ratio $I_H/I_L$ in Table 3 can be defined as the diffraction intensity ratio $I_{H1}/I_{L1}$.

TABLE 3

| | Crystal phase | Space group | L plane index | $2\theta_L$/deg | H plane index | $2\theta_H$/deg | Diffraction intensity ratio $I_H/I_L$ |
|---|---|---|---|---|---|---|---|
| Comparative Example 1 | orthorhombic | Fmmm | (113) | 28.97 | (024) | 45.19 | 2.35 |
| Comparative Example 2 | orthorhombic | Fmmm | (113) | 28.98 | (024) | 45.20 | 2.36 |
| Comparative Example 3 | orthorhombic | Fmmm | (113) | 28.97 | (024) | 45.18 | 2.35 |
| Comparative Example 4 | orthorhombic | Cmca | (132) | 29.13 | (044) | 45.36 | 2.17 |
| Example 1 | orthorhombic | Fmmm | (113) | 28.96 | (024) | 45.18 | 2.32 |
| Example 2 | orthorhombic | Fmmm | (113) | 28.99 | (024) | 45.19 | 2.21 |
| Example 3 | orthorhombic | Fmmm | (113) | 29.01 | (024) | 45.20 | 2.13 |
| Example 4 | orthorhombic | Fmmm | (113) | 29.03 | (024) | 45.23 | 1.97 |
| Example 5 | orthorhombic | Fmmm | (113) | 29.08 | (024) | 45.28 | 1.71 |
| Example 6 | orthorhombic | Fmmm | (113) | 29.09 | (024) | 45.29 | 1.54 |
| Example 7 | orthorhombic | Fmmm | (113) | 29.12 | (024) | 45.32 | 0.89 |
| Example 8 | orthorhombic | Fmmm | (113) | 29.02 | (024) | 45.22 | 2.11 |
| Example 9 | orthorhombic | Fmmm | (113) | 29.04 | (024) | 45.23 | 2.03 |
| Example 10 | orthorhombic | Fmmm | (113) | 29.00 | (024) | 45.19 | 2.23 |
| Example 11 | orthorhombic | Fmmm | (113) | 29.02 | (024) | 45.21 | 1.99 |
| Example 12 | orthorhombic | Fmmm | (113) | 28.98 | (024) | 45.18 | 2.19 |

Figure 8:
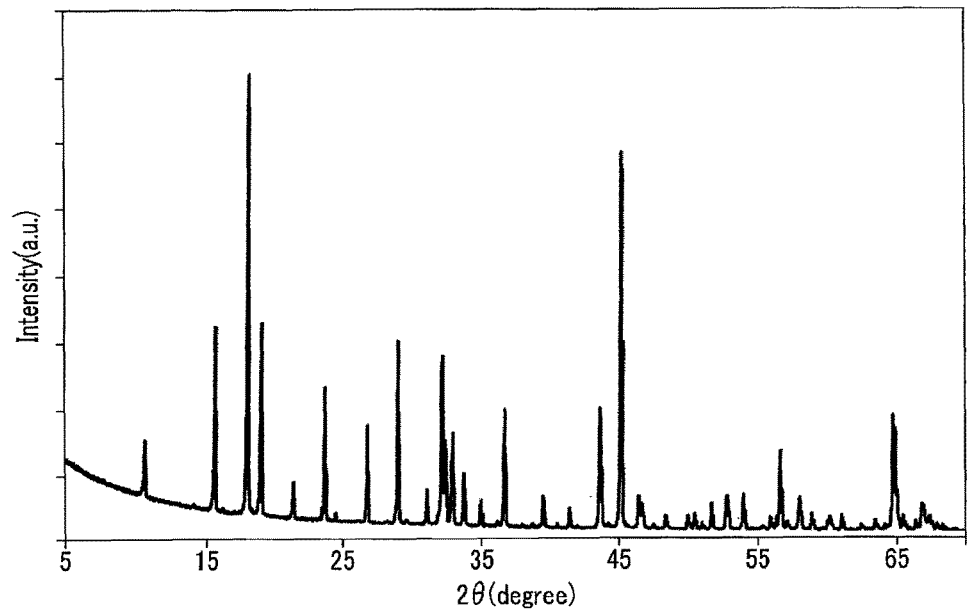
FIG. 8 is an X-ray diffraction chart of a product obtained in Example 3.
Figure 9:
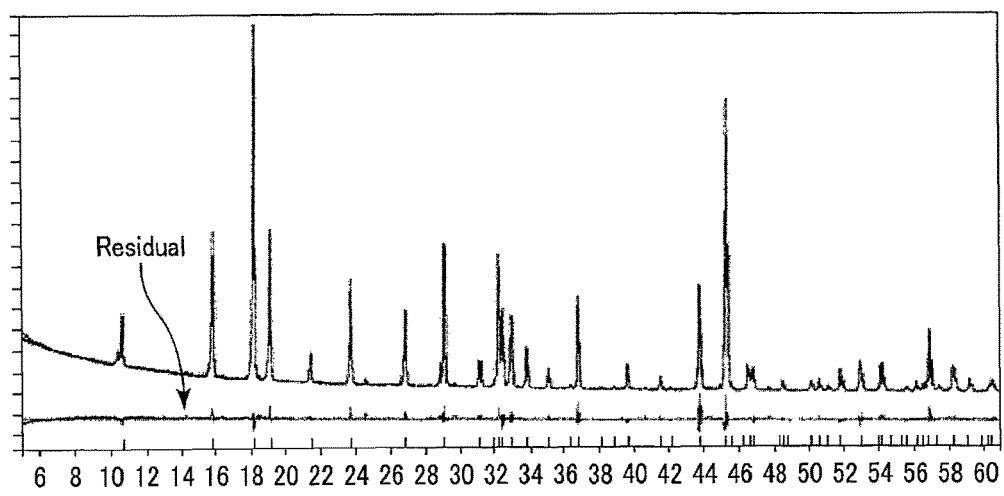
FIG. 9 is an X-ray diffraction chart showing residual between calculated values for X-ray diffraction pattern and actually measured values obtained by X-ray diffraction measurement of the product of Example 3.

As a typical X-ray chart, an X-ray diffraction chart from Example 3 is shown in FIG. 8. Further, Rietveld analysis was performed on the product of Example 3. As a result, it was determined that the product had the space group Fmmm symmetry, and that the total occupancy ratio of the 8i and 8g sites occupied by alkali metal was 0.89, therefore of a lesser value as compared to an occupancy ratio of 1.0 when all the sites are occupied. Thus, the presence of vacancies in the crystal lattice was examined also by the powder X-ray diffraction. FIG. 9 shows an X-ray diffraction chart showing the residual between calculated and actually measured values. At this time, the R factors were Rwp=7.46 and Re=5.65, respectively. The fitting parameter S indicating the degree of fitting was S=1.32. As such, the fitting results were relatively good. These parameters are explained in detail in "Reality of Powder X-Ray Analysis", X-Ray Analysis Investigation Conversazione, The Japan Society for Analytical Chemistry, written and edited by Izumi Nakai and Fujio Izumi (Asakura Publishing Co., Ltd.).

The formula: $Li_{2+x}Na_{2-y}M_zTi_6O_{14+\delta}$ described in the present application is crystallographically represented by $Li_{1+0.5x}Na_{1-0.5y}M_{0.5z}Ti_3O_{7+0.5\delta}$. In this case, the compound is treated as one having the crystal structure in FIG. 1 where a chemical formula number per unit lattice is Z=8.

(Electrochemical Measurement)

Each of the products obtained in Examples 1 to 14 and Comparative Examples 1 to 4 described above was subjected to an electrochemical measurement according to the following procedures. The following explanation is made using the product of Example 1 as an example; however, the electrochemical measurement of the products of other Examples and Comparative Examples were performed in the same manner as for that of the product of Example 1.

First, the product particles of Example 1 were ground to obtain a ground product having an average particle size of 5 μm or less. Next, acetylene black, as a conductive agent, was mixed with the active material (product of Example 1) in a proportion of 10 parts by mass relative to the active material to obtain a mixture. Then, the mixture was dispersed in NMP (N-methyl-2-pyrrolidone) to obtain a dispersion. Polyvinylidene fluoride (PVdF), as a binder, was mixed with the dispersion in a proportion of 10 parts by mass relative to the product of Example 1 to obtain an electrode slurry. A current collector, formed of aluminum foil, was coated with the slurry using a blade. This was dried at 130° C. for 12 hours under vacuum, and then rolled so that the density of an electrode layer (excluding a current collector) was 2.2 g/cm³ to obtain an electrode.

Using this electrode, a lithium metal foil as a counter electrode and nonaqueous electrolyte, an electrochemical measurement cell of Example 1 was produced. As a nonaqueous electrolyte, a solution in which lithium hexafluorophosphate ($LiPF_6$) was dissolved in a concentration of 1 M in a mixed solvent of ethylene carbonate and diethyl carbonate (volume ratio of 1:1) was used.

The electrochemical measurement cell of Example 1 was subjected to a charge-and-discharge test at room temperature. The charge-and-discharge test was performed within a potential range of 1.0 V to 3.0 V (vs. Li/Li⁺) with reference to the lithium metal electrode at a charge-and-discharge current value of 0.2 C (hourly discharge rate). A first Li insertion amount during this test was defined as an initial charge capacity, and a first Li extraction amount was defined as an initial discharge capacity. At this time, a value obtained by dividing an initial discharge capacity by the initial charge capacity, and multiplying the obtained value by 100 (initial discharge capacity/initial charge capacity×100) was defined as an initial charge-and-discharge efficiency.

Next, in order to examine whether or not the product of Example 1 can be stably charged and discharged, the electrochemical measurement cell of Example 1 was repeatedly subjected to 50 cycles of charge-and-discharge. One charge and one discharge was set as one cycle. The charge-and-discharge were performed at room temperature within a potential range of 1.0 V to 3.0 V (vs. Li/Li⁺) with reference to the lithium metal electrode at a current value of 1 C (hourly discharge rate). In order to examine the discharge capacity retention ratio after 50 cycles, the electrochemical measurement cell of Example 1 was charged and discharged again at 0.2 C (hourly discharge rate), and the discharge capacity after 50 cycles was determined. Based on the discharge capacity, the capacity retention ratio was calculated with the initial discharge capacity defined as 100%.

In addition, the discharge capacity at 0.2 C and the discharge capacity at 10.0 C of the electrochemical measurement cell of Example 1 were measured. The discharge capacity ratio (discharge rate) was calculated by dividing the discharge capacity at 10.0 C obtained by the measurement by the discharge capacity at 0.2 C similarly obtained by the measurement. The discharge capacity ratio serves an indicator of rate performance.

Table 4 below shows an initial charge-and-discharge capacity, an initial charge-and-discharge efficiency, a 10 C/0.2 C discharge capacity ratio, a capacity retention ratio after 50 cycles, and a potential at SOC (State-Of-Charge) 50%, for each of the electrochemical measurement cells of Examples 1 to 14 and the electrochemical measurement cells of Comparative Examples 1 to 4.

TABLE 4

|  | Initial discharge capacity (mAh/g) | Initial charge-and-discharge efficiency (%) | 10 C/ 0.2 C discharge capacity ratio | Capacity retention ratio after 50 cycles (%) | Potential at SOC 50% (V vs. $Li^+/Li$) |
| --- | --- | --- | --- | --- | --- |
| Comparative Example 1 | 90.8 | 92.0 | 89.8 | 90.5 | 1.28 |
| Comparative Example 2 | 90.7 | 92.2 | 90.1 | 90.7 | 1.28 |
| Comparative Example 3 | 91.5 | 90.9 | 89.3 | 90.1 | 1.27 |
| Comparative Example 4 | 105.1 | 89.3 | 89.5 | 89.9 | 1.45 |
| Example 1 | 92.3 | 92.5 | 90.5 | 91.2 | 1.28 |
| Example 2 | 95.2 | 92.7 | 90.8 | 92.8 | 1.29 |
| Example 3 | 113.1 | 92.4 | 90.6 | 92.5 | 1.31 |
| Example 4 | 125.3 | 92.3 | 90.9 | 93.1 | 1.31 |
| Example 5 | 120.1 | 92.1 | 91.2 | 92.8 | 1.35 |
| Example 6 | 96.7 | 92.2 | 90.9 | 93.5 | 1.37 |
| Example 7 | 92.4 | 92.0 | 90.5 | 93.0 | 1.40 |
| Example 8 | 111.2 | 92.2 | 90.6 | 92.5 | 1.30 |
| Example 9 | 112.5 | 92.3 | 90.3 | 91.8 | 1.30 |
| Example 10 | 115.6 | 92.0 | 90.7 | 92.2 | 1.30 |
| Example 11 | 122.9 | 93.1 | 90.8 | 91.5 | 1.29 |
| Example 12 | 118.3 | 92.6 | 91.2 | 92.4 | 1.29 |
| Example 13 | 120.5 | 92.1 | 93.6 | 94.5 | 1.29 |
| Example 14 | 119.4 | 92.3 | 92.8 | 93.9 | 1.29 |

[Charge-And-Discharge Curve]

FIG. 10 shows initial charge-and-discharge curves obtained by the electrochemical measurement of the electrochemical measurement cell of Example 3 and the electrochemical measurement cell of Comparative Example 1. As apparent from FIG. 10, at a potential within a range of 1.0 V to 2.0 V, which is the effective potential range for a negative electrode, the capacity of the electrochemical measurement cell in Comparative Example 1 (dashed line) is small, i.e., about 90 mAh/g.

On the contrary, as shown in FIG. 10, for the charge-and-discharge curves (charge curve 50 and discharge curve 51) of Example 3 (solid line), the electrode capacity within a range of 1.0 V to 2.0 V is higher than that (charge curve 40 and discharge curve 41) of Comparative Example 1 (dashed line). Accordingly, the product of Example 3 can provide a battery exhibiting a high energy density.

Although not shown in the drawings, in the initial charge-and-discharge curve of each of the electrochemical measurement cells of Examples 1, 2, and 4 to 14, the electrode capacity of the electrochemical measurement cell within a voltage range of 1.0 V to 2.0 V was higher than that of Comparative Example 1, similarly to Example 3. On the other hand, the charge-and-discharge capacity of Comparative Example 4 was higher than those of Examples 1 and 2, but the average operating potential was of a high value of 1.45 V. The products of Examples 1 and 2 have a lower negative electrode potential, and thus the battery voltage can be increased. As a result, it is possible to provide a battery exhibiting a high energy density.

Similarly, as for the rate performance and cycle performance, a trend has been seen where the capacity retention ratios in Examples 1 to 14 were higher than that of the Comparative Examples. Therefore, this product can exhibit a high energy density and a high battery voltage as the active material for a battery, and can realize a nonaqueous electrolyte battery excellent in rate performance and life performance.

Example 15

In Example 15, a nonaqueous electrolyte battery and a battery module were produced according to the following procedures.

(Production of Negative Electrode)

First, the product particles of Example 3 were ground to obtain a ground product having an average particle size of 5 μm or less. Next, acetylene black, as a conductive agent, was mixed with the active material in a proportion of 6 parts by mass relative to the product to obtain a mixture. Then, the mixture was dispersed in NMP (N-methyl-2-pyrrolidone) to obtain a dispersion. Polyvinylidene fluoride (PVdF), as a binder, was mixed with the dispersion in a proportion of 10 parts by mass relative to the product of Example 3 to obtain a negative electrode slurry. A current collector, made of aluminum foil, was coated with the slurry using a blade. This was dried at 130° C. for 12 hours under vacuum, and then rolled so that the density of an electrode layer (excluding a current collector) was 2.3 g/cm$^3$ to obtain a negative electrode.

(Production of Positive Electrode)

A commercially available spinel lithium manganese oxide ($LiMn_2O_4$) was mixed with 5 parts by weight of acetylene black as a conductive auxiliary agent to obtain a mixture. Next, the mixture was dispersed in NMP to obtain a dispersion. The dispersion was mixed with PVdF, as a binder, in an amount of 5 parts by weight relative to the lithium manganese oxide to prepare a positive electrode slurry. A current collector, made of aluminum foil, was coated with the slurry using a blade. This was dried at 130° C. for 12 hours under vacuum, and then rolled so that the density of an electrode layer (excluding a current collector) was 2.1 g/cm$^3$ to obtain a positive electrode.

(Production of Electrode Group)

The positive electrode and the negative electrode produced as described above were stacked with a polyethylene separator sandwiched therebetween to obtain a stack. Next, this stack was wound and pressed to obtain a flat-shaped wound electrode group. A positive electrode terminal and a negative electrode terminal were connected to this electrode group.

(Preparation of Nonaqueous Electrolyte)

As a mixed solvent, a mixed solvent of ethylene carbonate and diethyl carbonate (volume ratio of 1:1) was provided. Lithium hexafluorophosphate ($LiPF_6$) was dissolved in this solvent in a concentration of 1 M. Thus, the nonaqueous electrolyte was prepared.

(Assembly of Nonaqueous Electrolyte Battery and Battery Module)

Using the electrode group and the nonaqueous electrolyte produced as described above, a nonaqueous electrolyte battery of Example 15 was produced. Five nonaqueous electrolyte batteries of Example 15 were produced and connected in series to obtain a battery module.

(Charge-and-Discharge Test)

The battery module of nonaqueous electrolyte batteries of Example 15 was subjected to a charge-and-discharge test at room temperature. The charge-and-discharge test was performed at a charge-and-discharge current value of 0.2 C (hourly discharge rate) within a battery voltage range of 9 V to 16 V.

FIG. 11 shows a charge-and-discharge curve (charge curve 60 and discharge curve 61) of the battery module of nonaqueous electrolyte batteries of Example 15. As shown in FIG. 11, the voltage of the battery module of Example 15 changed smoothly within a range of 15.1 V to 11.5 V. This shows that, in each of the nonaqueous electrolyte batteries (unit cells) in Example 15, the voltage changes smoothly within a range of 2.3 V to 3.0 V. Hence, a nonaqueous electrolyte battery in which the voltage changes smoothly within a voltage range of 2.3 V to 3.0 V had been obtained, by using the product of Example 3. When five of the nonaqueous electrolyte batteries are connected to each other in series, a higher operating voltage range than that obtained in a case using a spinel lithium titanate ($Li_4Ti_5O_{12}$) as the negative electrode, i.e., 15.1 V to 11.5 V, is obtained. Hence, the nonaqueous electrolyte battery has a high operating voltage range, and thus as described above, a battery module and battery pack having a voltage compatible with a 12 V lead storage battery for automobiles can be fabricated.

According to at least one embodiment and Example explained above, an active material including a composite oxide having an orthorhombic crystal structure belonging to a space group Fmmm is provided. This composite oxide is represented by a formula: $Li_{2+x}Na_{2-y}M_zTi_6O_{14+\delta}$. The composite oxide can exhibit a large potential change in accordance with a change of capacity in a potential range of 1.0 V (vs. $Li/Li^+$) to 1.45 V (vs. $Li/Li^+$). An average operating potential of this composite oxide can be adjusted by changing a Na amount. Further, the composite oxide has vacant sites, and thus able to have a crystal structure in which lithium ions are easily inserted into and extracted from the crystal structure. Accordingly, a high reversible capacity during charge-and-discharge and excellent life performance can be realized. As a result, the active material can, as a battery active material, realize a nonaqueous electrolyte battery capable of exhibiting high energy density, high battery voltage, and excellent life performance, and capable of easily managing the voltage thereof.

While certain embodiments have been described, these embodiments have been presented by way of example only, and are not intended to limit the scope of the inventions. Indeed, the novel methods and systems described herein may be embodied in a variety of other forms; furthermore, various omissions, substitutions and changes in the form of the methods and systems described herein may be made without departing from the spirit of the inventions. The accompanying claims and their equivalents are intended to cover such forms or modifications as would fall within the scope and spirit of the inventions.

What is claimed is:

1. An active material comprising:
   a composite oxide having an orthorhombic crystal structure belonging to a space group Fmmm, the composite oxide represented by a formula: $Li_{2+x}Na_{2-y}M_zTi_6O_{14+\delta}$,
   wherein M is at least one selected from the group consisting of Mg, Ca, and Ba,
   x is within a range of $0 \leq x \leq 6$,
   y is within a range of $0 < y < 2$,
   z is within a range of $0 < z < 1$,
   δ is within a range of $-0.5 \leq \delta \leq 0.5$, and
   y is greater than z.

2. The active material according to claim 1, wherein, in an X-ray diffraction pattern for the composite oxide obtained by powder X-ray diffraction using Cu-Kα rays, an intensity ratio $I_H/I_L$ is within a range of $0 < I_H/I_L < 2.35$, wherein $I_L$ is an intensity of a strongest diffraction peak appearing in a range of $27.0° \leq 2\theta \leq 31.0°$, and $I_H$ is an intensity of a strongest diffraction peak appearing in a range of $44.0° \leq 2\theta \leq 46.0°$.

3. The active material according to claim 1, wherein, in an X-ray diffraction pattern for the composite oxide obtained by powder X-ray diffraction using Cu-Kα rays, an intensity ratio $I_{H1}/I_{L1}$ is within a range of $0 < I_{H1}/I_{L1} < 2.35$, wherein $I_{L1}$ is an intensity of a diffraction peak corresponding to a (113) plane, and $I_{H1}$ is an intensity of a diffraction peak corresponding to a (024) plane.

4. The active material according to claim 1, wherein the composite oxide is represented by a formula: $Li_{2+x}Na_{2-y}Mg_zTi_6O_{14+\delta}$.

5. The active material according to claim 1, wherein subscripts x, y, z, and δ in the formula satisfy the following formula:

$$x - y + 2 \times z = \delta.$$

6. A nonaqueous electrolyte battery comprising:
   a negative electrode including the active material according to claim 1;
   a positive electrode; and
   a nonaqueous electrolyte.

7. A battery pack comprising the nonaqueous electrolyte battery according to claim 6.

8. The battery pack according to claim 7 further comprising:
   an external power distribution terminal; and
   a protective circuit.

9. The battery pack according to claim 7, comprising more than one of said nonaqueous electrolyte batteries being electrically connected in series, in parallel, or in a combination of in a series and in parallel.

10. A vehicle comprising the battery pack according to claim 7.

11. The vehicle according to claim 10, wherein the battery pack is configured to recover a regenerative energy of a power of the vehicle.

12. An electrode comprising the active material according to claim 1.

* * * * *